(12) United States Patent
Nguyen

(10) Patent No.: US 10,773,465 B1
(45) Date of Patent: Sep. 15, 2020

(54) CLAMPING DEVICE FOR JOINING BOARDS

(71) Applicant: Nhon Hoa Nguyen, Bankstown (AU)

(72) Inventor: Nhon Hoa Nguyen, Bankstown (AU)

(*) Notice: Subject to any disclaimer, the term of this patent is extended or adjusted under 35 U.S.C. 154(b) by 0 days.

(21) Appl. No.: 16/593,733

(22) Filed: Oct. 4, 2019

Related U.S. Application Data

(60) Provisional application No. 62/741,557, filed on Oct. 5, 2018.

(51) Int. Cl.
| | |
|---|---|
| *B25B 5/00* | (2006.01) |
| *B25B 5/10* | (2006.01) |
| *B29C 65/00* | (2006.01) |
| *B25B 5/14* | (2006.01) |
| *B29C 65/48* | (2006.01) |
| *B27C 5/06* | (2006.01) |

(52) U.S. Cl.
CPC .......... *B29C 66/8145* (2013.01); *B25B 5/003* (2013.01); *B25B 5/006* (2013.01); *B25B 5/145* (2013.01); *B27C 5/06* (2013.01); *B29C 65/48* (2013.01); *B25B 5/142* (2013.01)

(58) Field of Classification Search
CPC .......... B25B 5/003; B25B 5/006; B25B 5/142; B25B 5/145; B27C 5/06; B29C 66/8145
See application file for complete search history.

(56) References Cited

U.S. PATENT DOCUMENTS

| | | | |
|---|---|---|---|
| 6,648,318 B1* | 11/2003 | Oetlinger | B23K 37/0435 269/41 |
| 8,322,697 B2* | 12/2012 | Lin | B25B 5/142 269/42 |
| 9,498,868 B2* | 11/2016 | Quaiz | B25B 5/142 |
| 2007/0284797 A1* | 12/2007 | Nguyen | B25B 5/142 269/41 |
| 2013/0221590 A1* | 8/2013 | Kerckhofs | B25B 5/00 269/21 |
| 2017/0312891 A1* | 11/2017 | Schmieder | B25B 5/067 |

\* cited by examiner

*Primary Examiner* — Mark A Osele
(74) *Attorney, Agent, or Firm* — Tue Nguyen

(57) ABSTRACT

A clamping device is used for joining panels or boards with highly cosmetic appearance at the visible joined surface. The clamping device can include mechanisms to support and move one panel relative to another panel in two directions perpendicular to the beveled edges of the panels. The clamping device can include a rotational mechanism to rotate one panel around a direction parallel to the beveled edge.

19 Claims, 25 Drawing Sheets

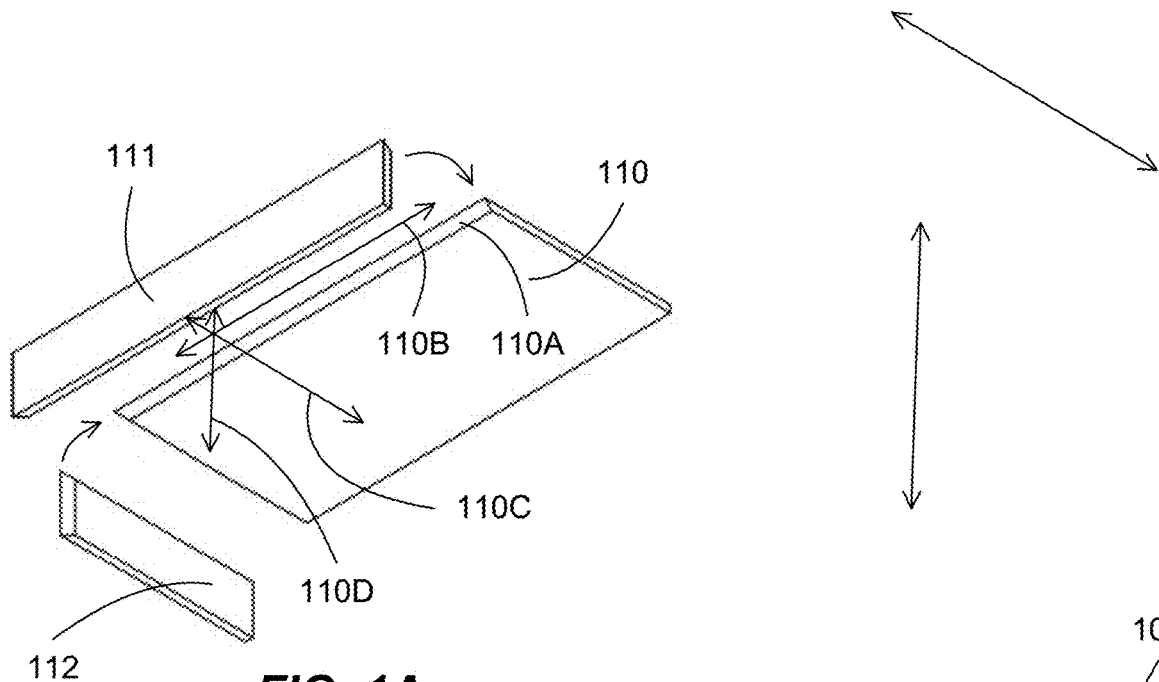
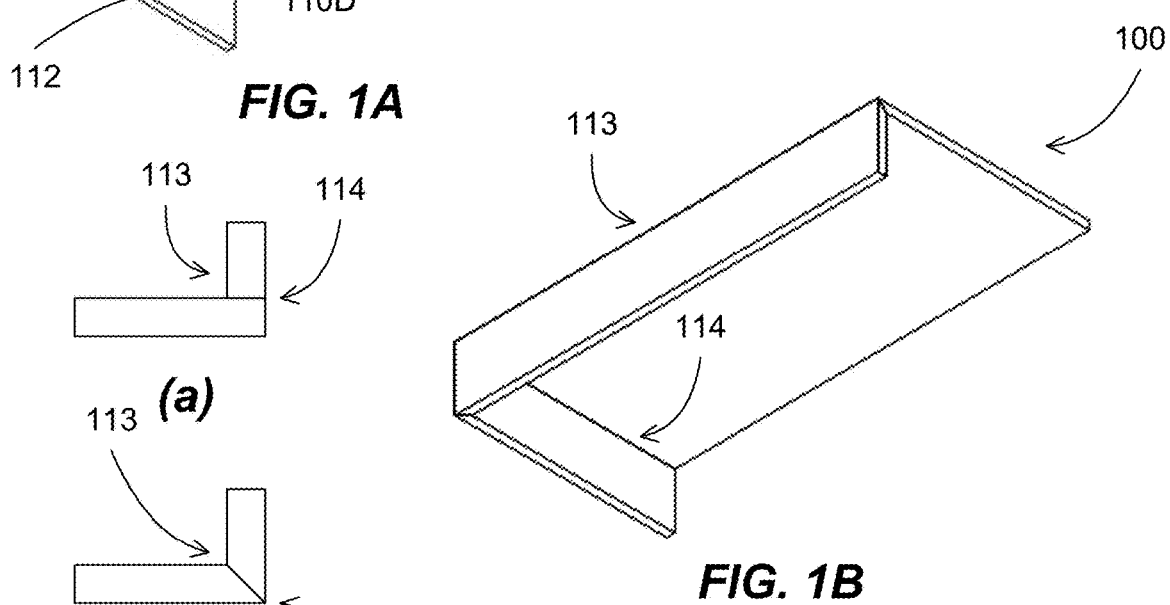
FIG. 1A
FIG. 1B
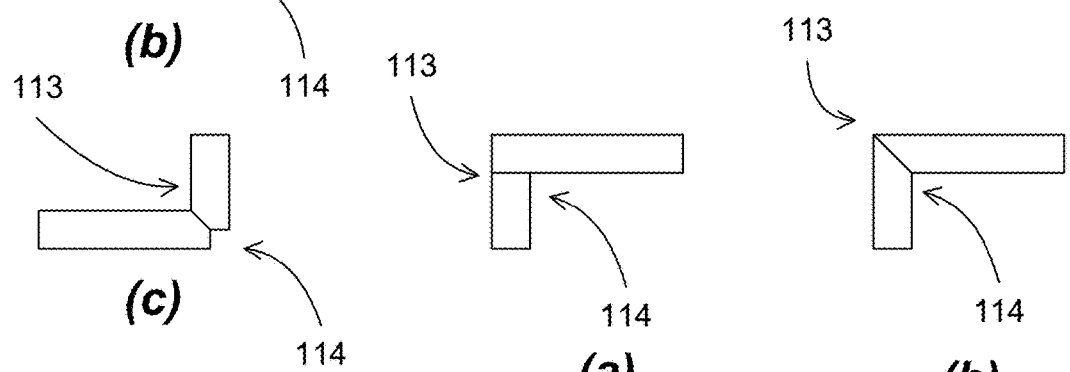
FIG. 1C
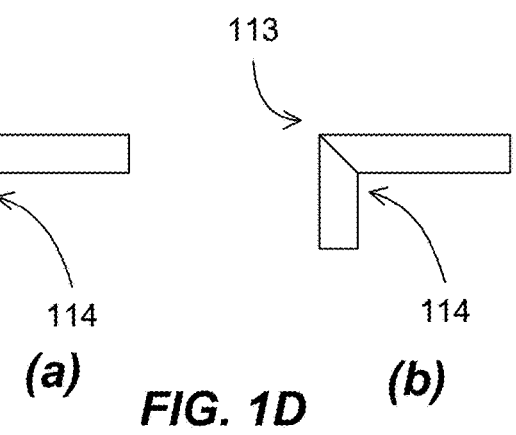
FIG. 1D

```
┌─────────────────────────────────────────────────────────┐
│   Providing two plates each having a beveled edge       │
│                         200                             │
└─────────────────────────────────────────────────────────┘
                            ↓
┌─────────────────────────────────────────────────────────┐
│  Attaching the two beveled edges of the two plates,     │
│  wherein attaching is configured to provide a cosmetic  │
│  joined edge                                            │
│                         210                             │
└─────────────────────────────────────────────────────────┘
```

*FIG. 2A*

```
┌─────────────────────────────────────────────────────────┐
│       Applying glue to beveled edges of two plates      │
│                         230                             │
└─────────────────────────────────────────────────────────┘
                            ↓
┌─────────────────────────────────────────────────────────┐
│  Securing the two glued beveled edges together to form  │
│  a cosmetic joined edge                                 │
│                         240                             │
└─────────────────────────────────────────────────────────┘
```

*FIG. 2B*

```
┌─────────────────────────────────────────────────────────┐
│  Positioning two plates so that sides of beveled edges  │
│  of the two plates are in contact with a cosmetic       │
│  joined interface                                       │
│                         260                             │
└─────────────────────────────────────────────────────────┘
                            ↓
┌─────────────────────────────────────────────────────────┐
│  Operating a clamp so that the two plates are separated │
│  from each other, wherein the clamp is configured to    │
│  move at least one plate at a repeatable precision      │
│                         270                             │
└─────────────────────────────────────────────────────────┘
                            ↓
┌─────────────────────────────────────────────────────────┐
│  Applying glue to the beveled edges and operating the   │
│  clamp to secure the two beveled edges                  │
│                         280                             │
└─────────────────────────────────────────────────────────┘
```

*FIG. 2C*

Forming a clamp for securing two plates along beveled edges, wherein the clamp comprises a first support having a first securing mechanism for support a first plate, wherein the clamp comprises a second support coupled to the first support to secure a second plate against the first plate according to a desire configuration, wherein the clamp comprises a movable second securing mechanism for securing the second plate, wherein the movable second securing mechanism is configured to be movable relative to the second support to accommodate different lengths of the second plate, wherein the movable second securing mechanism comprises a first securing element for securing the second plate with the second support, wherein the movable second securing mechanism comprises a second securing element for securing the beveled edges of the second plate with the beveled edges of the first plate
500

*FIG. 5A*

Placing and securing a first plate on a first support of a clamp
520

Optionally adjusting a movable mechanism attached to a second support of the clamp to accommodate a second plate
530

Placing the second plate on the second support
540

Securing the second plate to the second support and to the first plate
550

*FIG. 5B*

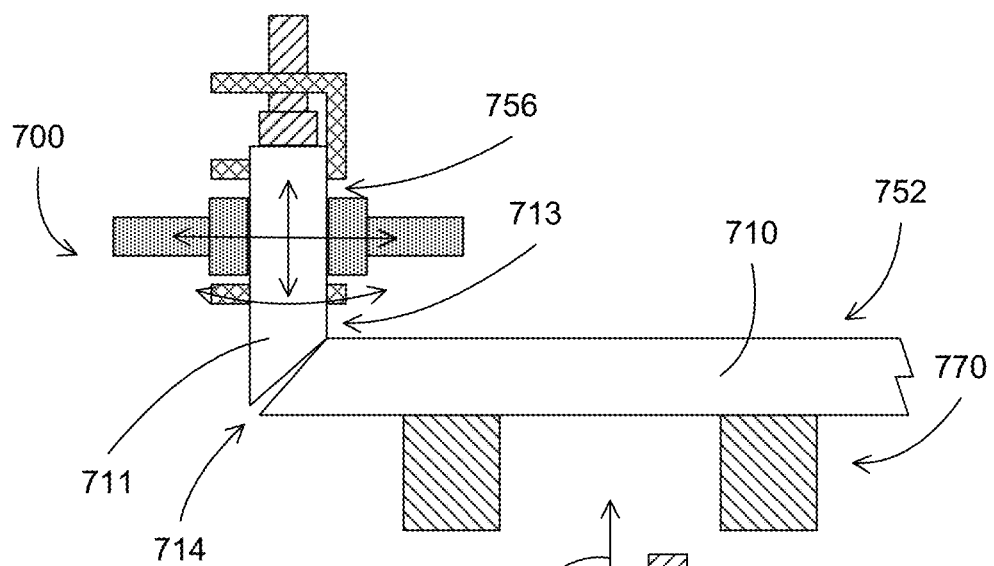
FIG. 7A
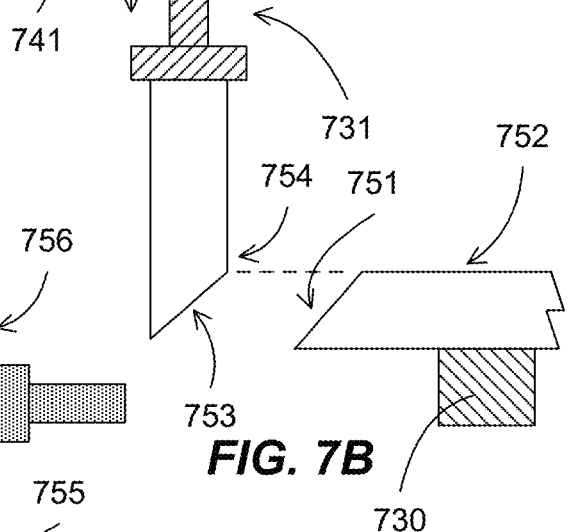
FIG. 7B
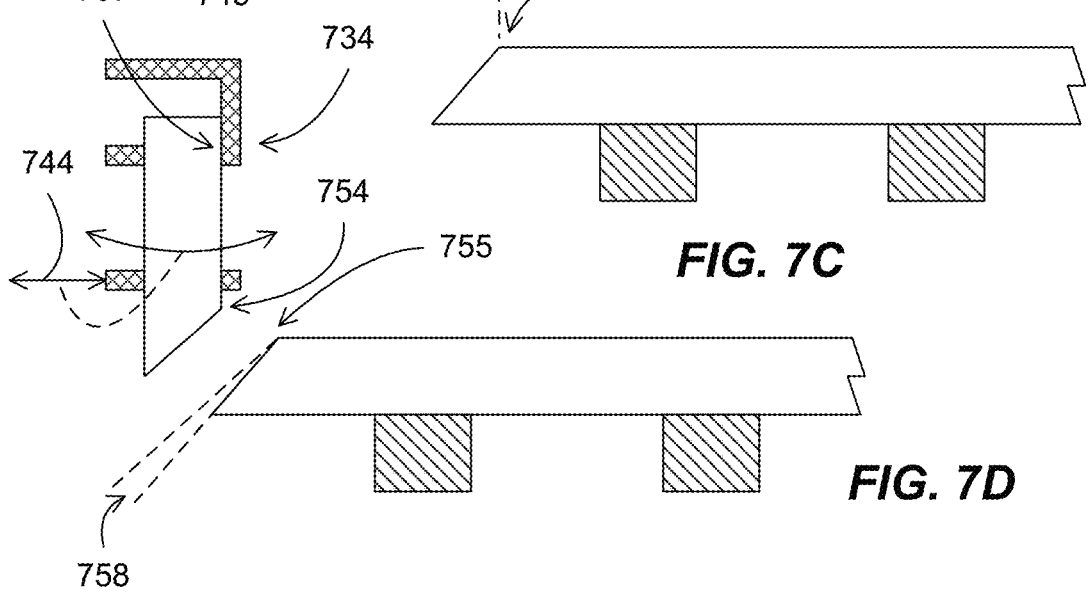
FIG. 7C
FIG. 7D

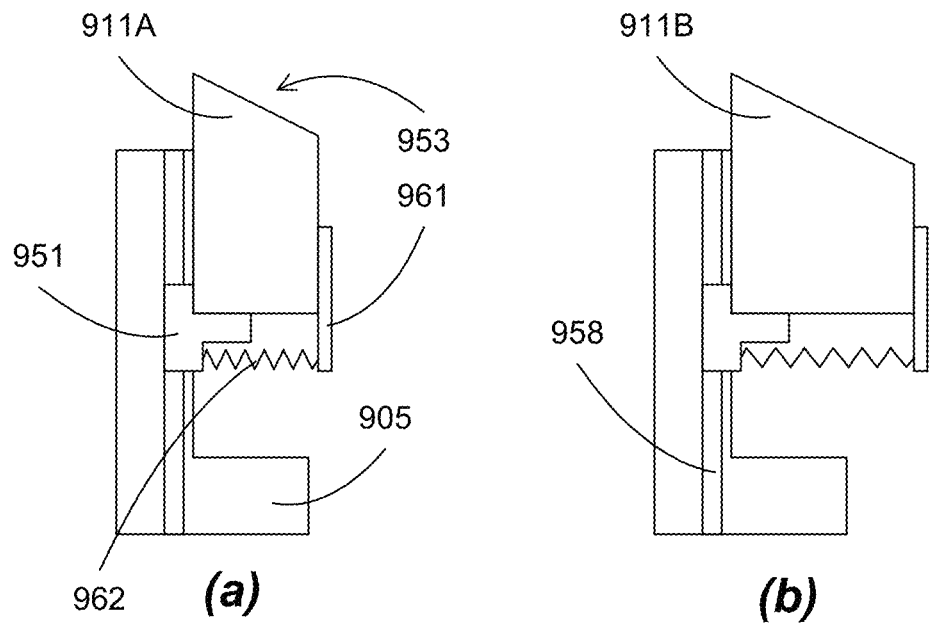
FIG. 9A
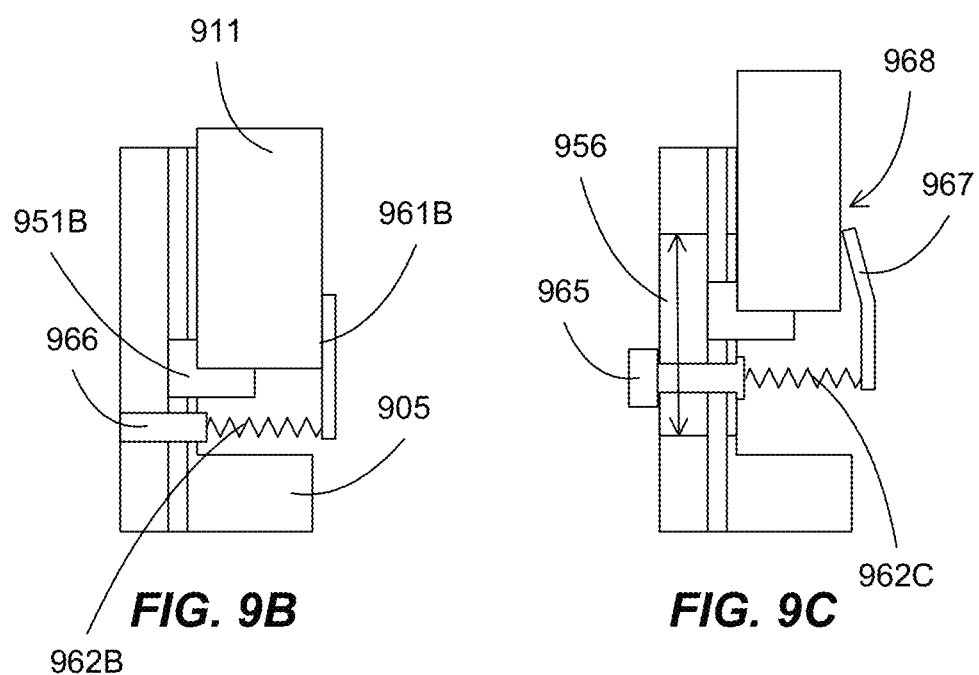
FIG. 9B  FIG. 9C

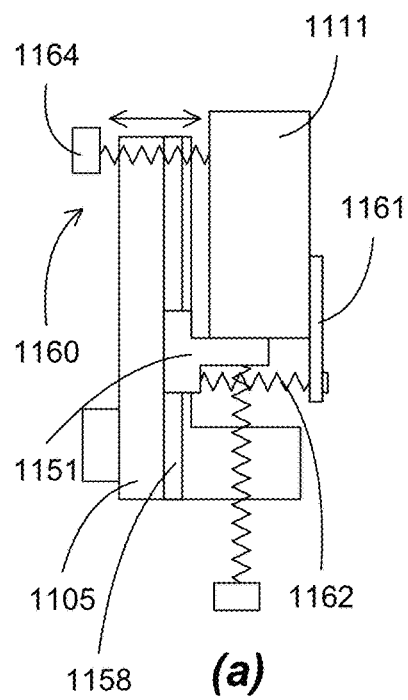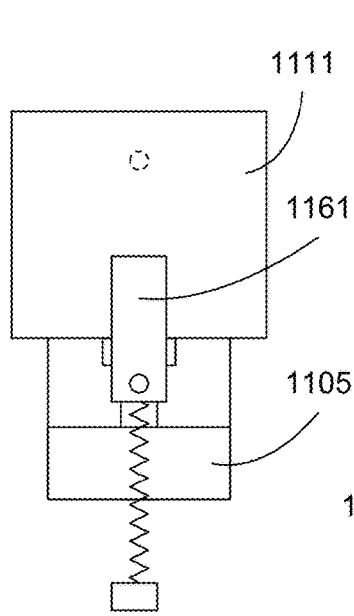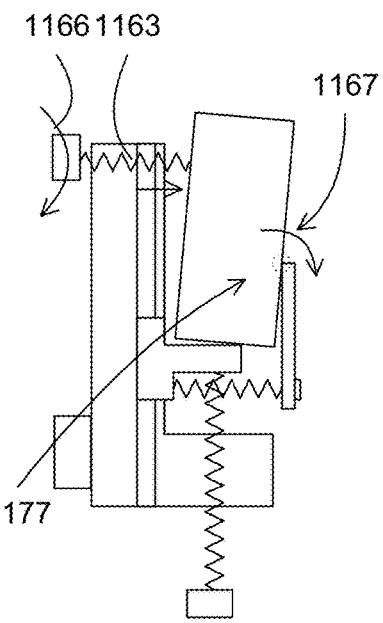
FIG. 11A　　　FIG. 11B
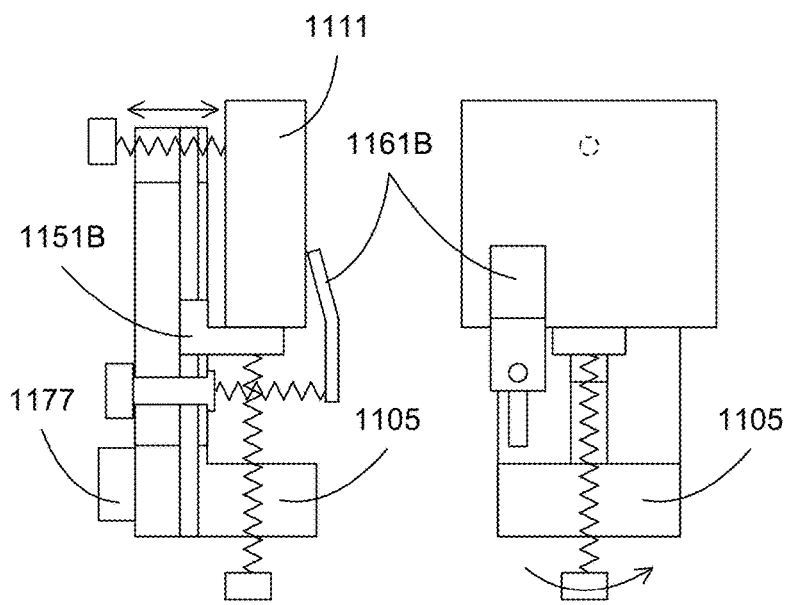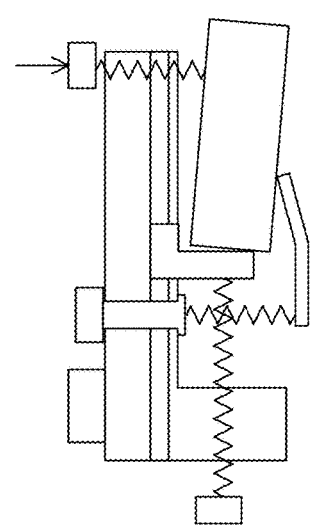
FIG. 11C　　　FIG. 11D Forming a clamp for securing a second plate against a first plate along beveled edges, wherein the clamp comprises a first movable mechanism for moving the second plate along a first direction, wherein the clamp comprises a second movable mechanism for moving the second plate along a second direction, wherein the second movable mechanism comprises a coarse movement and a fine movement, wherein the clamp comprises a third movable mechanism for rotating the second plate around an element of the clamp that is configured for securing the second plate
1900

*FIG. 19A*

Forming a clamp assembly for securing a second plate against a first plate along beveled edges, wherein the clamp assembly comprises a support for supporting the first plate, wherein the clamp assembly comprises at least a clamp for supporting the second plate, wherein the clamp comprises a coupling mechanism for securing the clamp to the support, wherein the clamp comprises a first movable mechanism for moving the second plate along a first direction, wherein the clamp comprises a second movable mechanism for moving the second plate along a second direction, wherein the second movable mechanism comprises a coarse movement and a fine movement, wherein the clamp comprises a third movable mechanism for rotating the second plate around an element of the clamp that is configured for securing the second plate
1920

*FIG. 19B*

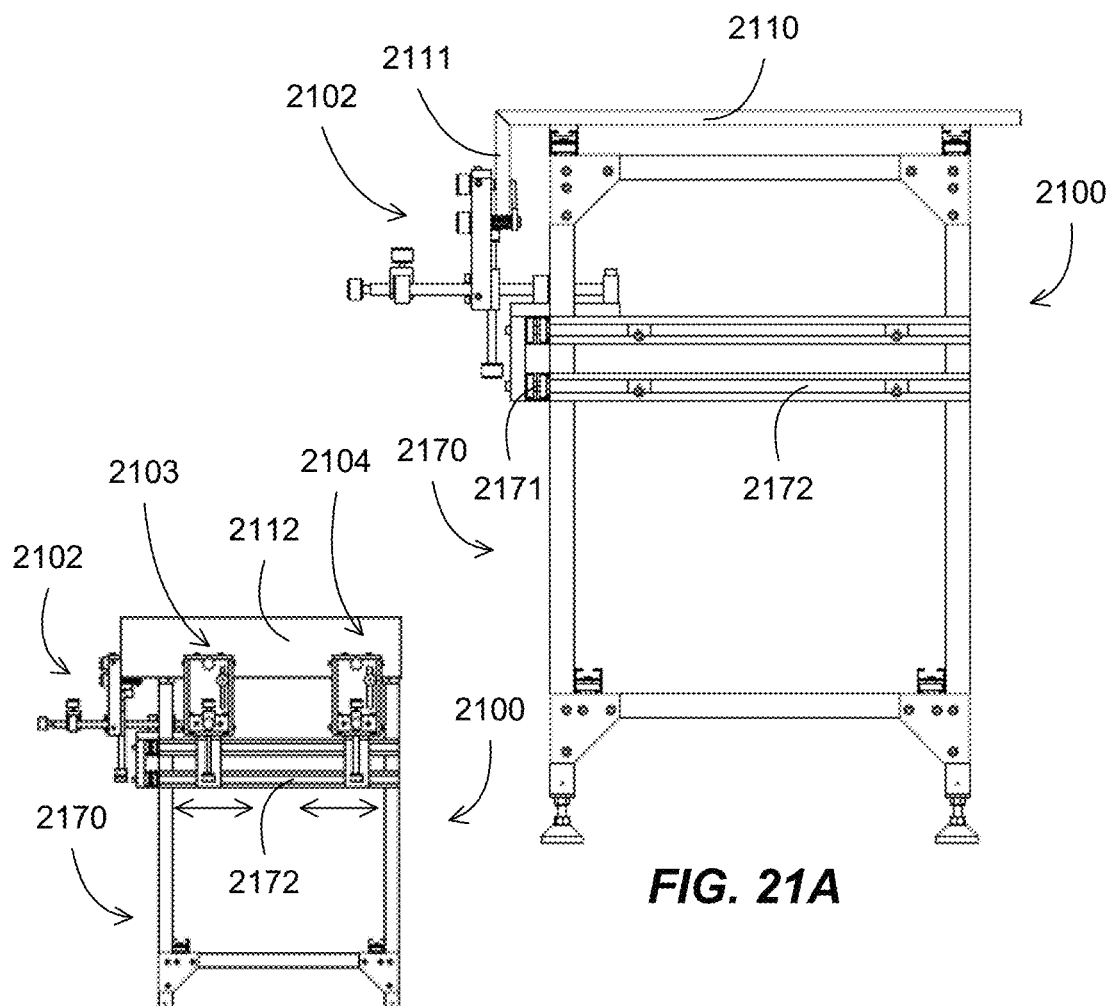
FIG. 21A
FIG. 21C
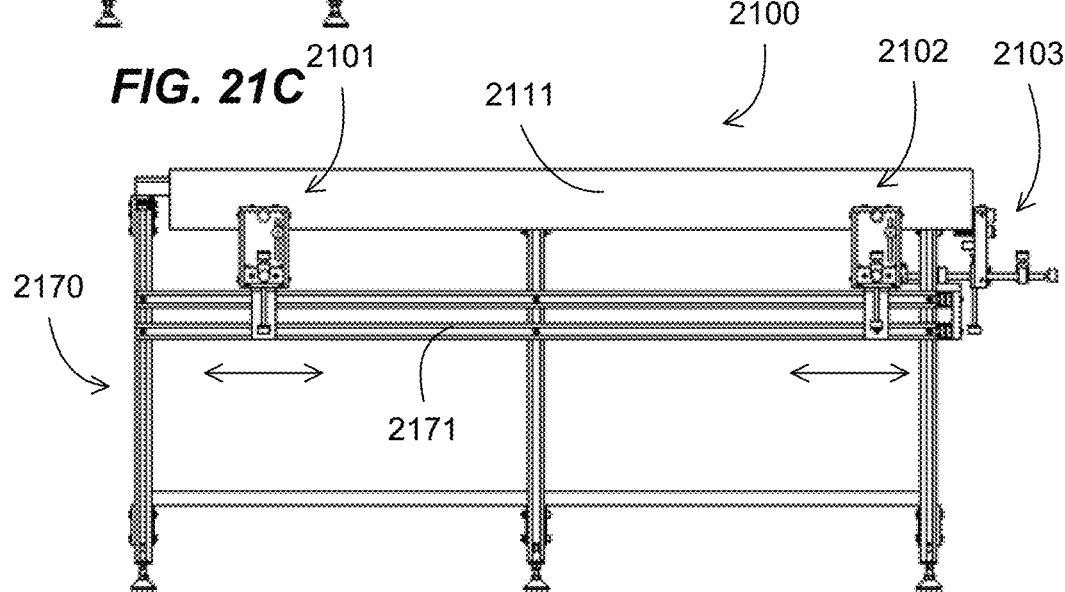
FIG. 21B

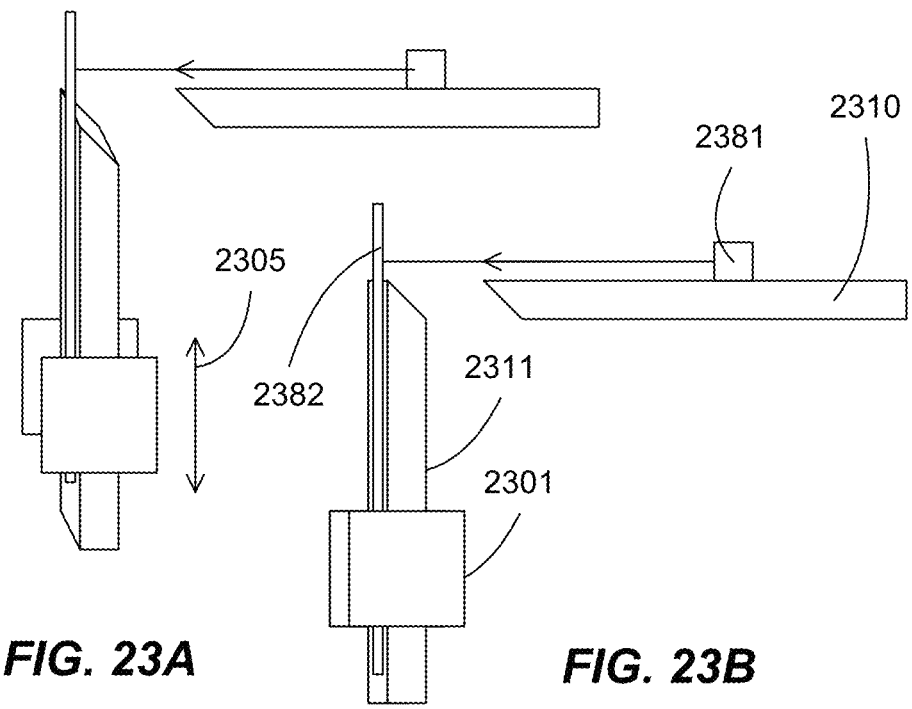
FIG. 23A  FIG. 23B
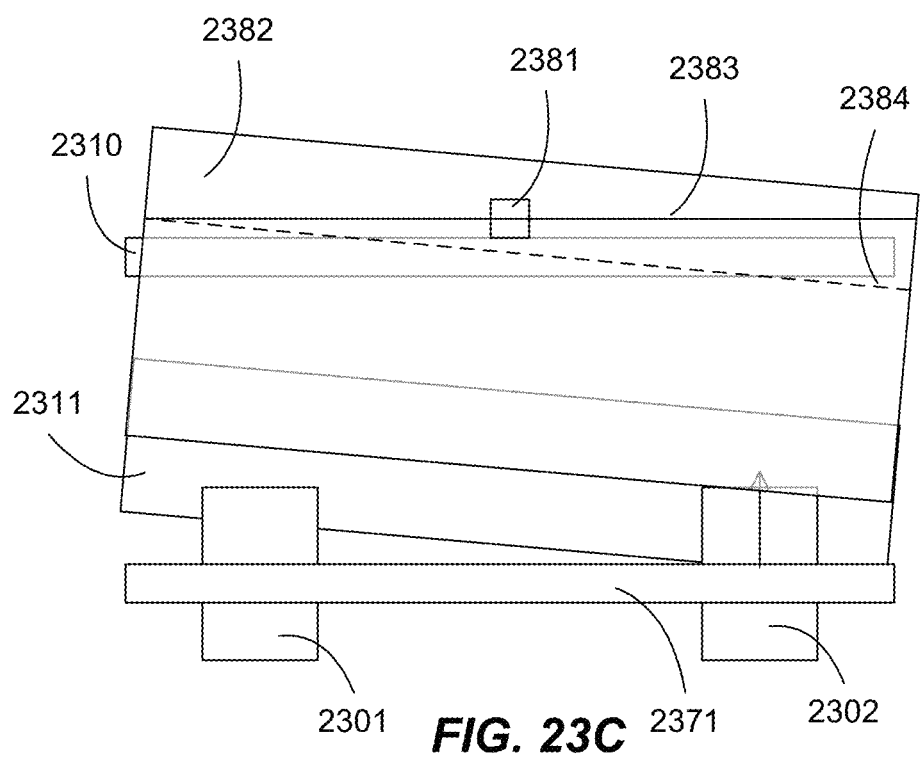
FIG. 23C

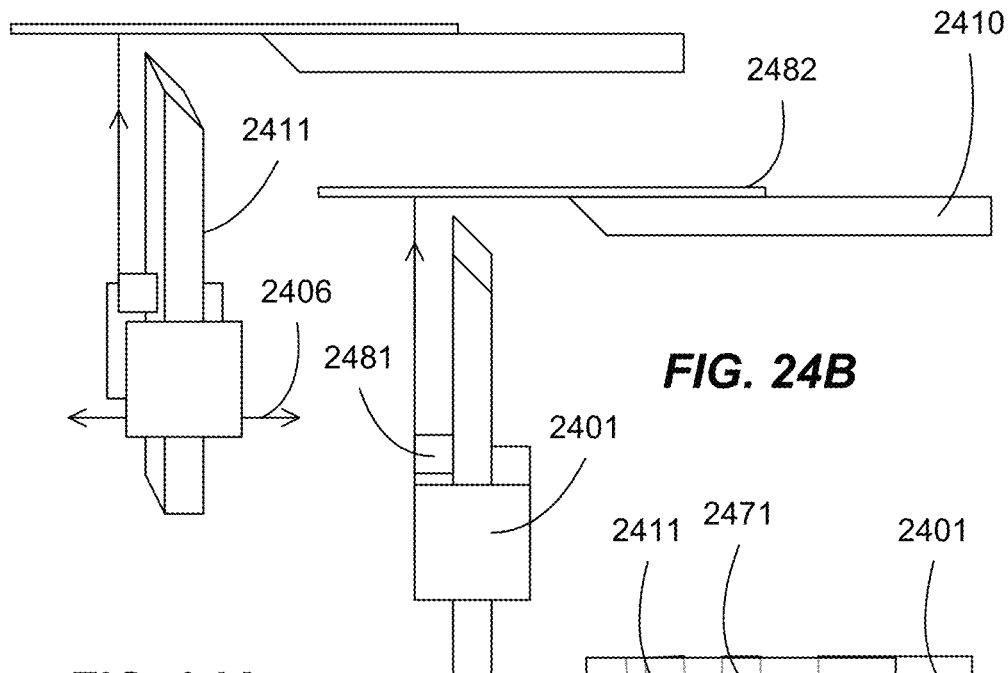
FIG. 24A
FIG. 24B
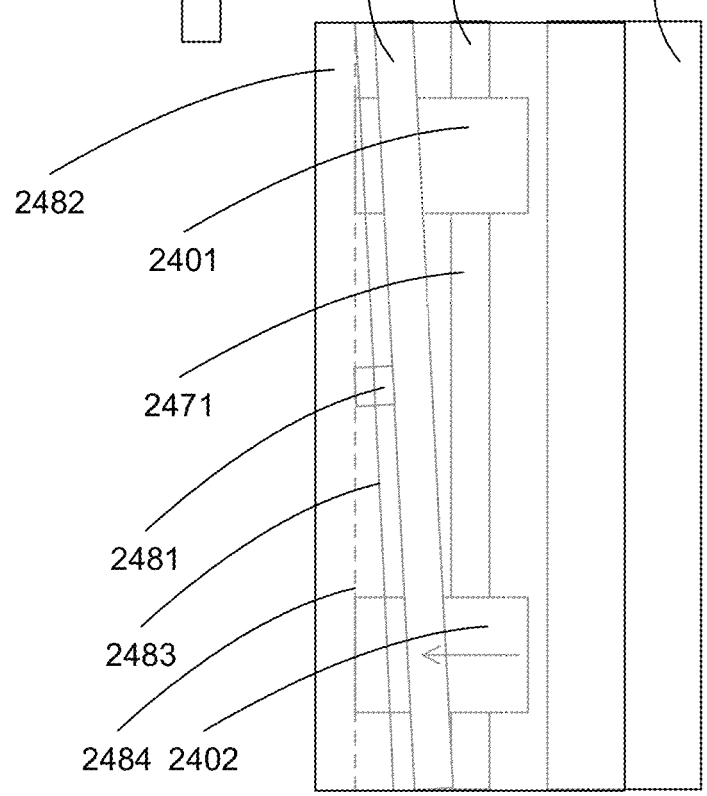
FIG. 24C

Forming a clamp assembly for securing a second plate against a first plate along beveled edges, wherein the clamp assembly comprises a support for supporting the first plate, wherein the clamp assembly comprises multiple clamps for supporting the second plate, wherein the multiple clamps are movably coupled to the support to adjust a distance between the multiple clamps
2500

*FIG. 25A*

Forming a clamp assembly for securing a second plate against a first plate along beveled edges, wherein the clamp assembly comprises a support for supporting the first plate, wherein the clamp assembly comprises multiple clamps for supporting the second plate, wherein the multiple clamps are movably coupled to the support to move the multiple clamps as a unit along a direction of alignment the second plate to the first plate
2525

*FIG. 25B*

Forming a clamp assembly for securing multiple plates against a first plate along beveled edges, wherein the clamp assembly comprises a support for supporting the first plate, wherein the clamp assembly comprises multiple first clamps for supporting a second plate of the multiple plates to be secured to the first plate in a first direction, wherein the multiple first clamps are movably coupled to the support to adjust a distance between the multiple first clamps, wherein the clamp assembly comprises multiple second clamps for supporting a third plate of the multiple plates to be secured to the first plate in a second direction, wherein the multiple second clamps are movably coupled to the support to adjust a distance between the multiple second clamps
2540

*FIG. 25C*

CLAMPING DEVICE FOR JOINING BOARDS

The present application claims priority from U.S. Provisional Patent Application Ser. No. 62/741,557, filed on Oct. 5, 2018, entitled "Clamping device for joining boards", which is incorporated herein by reference.

The present invention relates to clamping devices. More particularly, it relates to clamping devices for joining panels or boards using an adhesive material along beveled edges.

BACKGROUND

Countertops made of solid thick panels, such as wood or granite, have become quite popular in kitchens, bathrooms, and offices. The growing popularity of these materials is due to the material having the qualities of high durability, ease of cleaning and sterilization, and beauty. Another aspect of panel countertops is the appearance of a single and continuous countertop even when it is fabricated from many adhesively bonded sections.

Countertops can be made by registerable side edges on the sides of two large panels of the material to be adhesively joined. The registration of the edges is important for achieving matching levels of two joined flat panels. For example, proper registration of two adjacent panels is critical in terms of reducing finishing sanding and in achieving an overall seamless countertop surface.

Another typical procedure is to clamp the panels to draw seams together during the joining process. The clamping can be important to achieve a strong and properly aligned joint, including an imperceptible finished joint. For example, set-screw clamps or spring biased squeeze clamps can be used to apply clamping pressures to the joints during the adhering process. In addition, mechanical attachments such as screws, can be used to gain a more stable and permanent attachment.

SUMMARY OF THE EMBODIMENTS

In some embodiments, the present invention discloses a clamping device for joining panels or boards with highly cosmetic appearance at the visible joined surface. The panels can have beveled edges, e.g., having side surfaces that are not perpendicular to the top or bottom surface.

The clamping device can include a first assembly configured to support and to move a first panel. The support can include a bottom support and a side support for the first panel. The bottom support can be coupled to a movement mechanism to move the first panel in a first direction, such as the vertical direction. The first direction can be the direction perpendicular to the direction along the beveled edge and also perpendicular to the second panel. The vertical movement mechanism can move the first panel in fine steps and in coarse steps.

The side support can function as a pivot point for a rotation mechanism to rotate the first panel. In some embodiments, the rotation mechanism can be configured to rotate the first panel in one direction, e.g., the direction to enlarge an angled gap between the beveled edges for accommodating an adhesive material. The axis of rotation can be the direction along the beveled edges.

The first assembly can be mounted on a horizontal linear guide. The first assembly can be coupled to a horizontal movement mechanism that can move the first assembly in a second direction, such as the horizontal direction, in fine steps and in coarse steps. The second direction can be the direction perpendicular to the direction along the beveled edge and also perpendicular to the first panel.

In some embodiments, the present invention discloses a clamping system for joining panels or boards with highly cosmetic appearance at the visible joined surface. The clamping system can include a panel support for supporting a panel. The clamping system can include one or more clamping devices coupled to the panel support through one or more rails on the panel support.

In some embodiments, the present invention discloses a method for joining panels or boards with highly cosmetic appearance at the visible joined surface. The method can include aligning the beveled edges to achieve the cosmetic appearance using fine step movements. The method can include separating the panels to apply an adhesive material, using coarse step movements. The coarse step movements can be reversed to realign the panels with the applied adhesive.

BRIEF DESCRIPTION OF THE DRAWINGS

FIGS. 1A-1D illustrate individual panels and joined panels to form a work surface equipment according to some embodiments.

FIGS. 2A-2C illustrate flow charts for joining panels according to some embodiments.

FIGS. 5A-5B illustrate flow charts for forming a clamp and a method to operate the clamp according to some embodiments.

FIGS. 7A-7D illustrate a clamping configuration according to some embodiments.

FIGS. 9A-9C illustrate configuration for an assembly having a support according to some embodiments.

FIGS. 11A-11D illustrate configurations of a mechanism configured to rotate a panel in a lateral direction according to some embodiments.

FIGS. 19A-19B illustrate flow charts for operating the clamp according to some embodiments.

FIGS. 21A-21C illustrate a clamping device according to some embodiments.

FIGS. 23A-23C illustrate an alignment mechanism and process for aligning a side panel according to some embodiments.

FIGS. 24A-24C illustrate an alignment mechanism and process for aligning a side panel according to some embodiments.

FIGS. 25A-25C illustrate flow charts for operating the clamp according to some embodiments.

DETAILED DESCRIPTION OF THE EMBODIMENTS

Figure 3A:
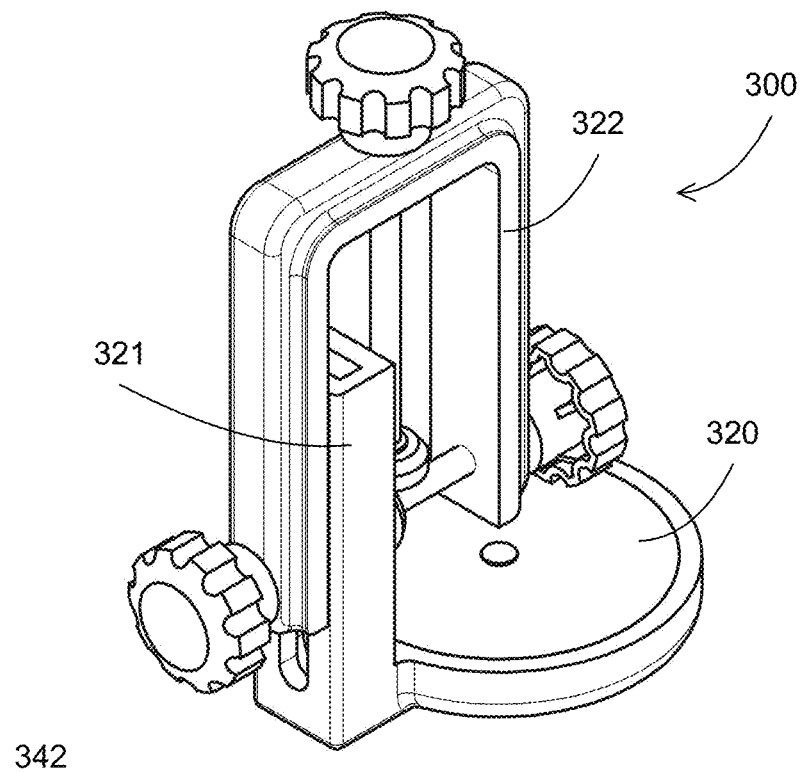
FIGS. 3A-3C illustrate a clamping device according to some embodiments.

In some embodiments, the present invention discloses a clamping device for joining edges of panels, boards, or generally flat substrates. The panels can be joined in different planes, such as forming an angle, including a right angle, with mutually abutting edge surfaces. The clamping device can allow coarse and fine adjustments of the joining of the panels to achieve an aesthetic looking interface.

In some embodiments, the present invention discloses a clamping device and methods for use thereof, which can facilitate the joining of two panels of a work surface equipment, such as a countertop or other shelving constructions. The clamping device can allow joining two sections either at the site of manufacture or at the site of installation.

The clamping device can join flat pieces having cut joints, such as forming edge joining along the mitered edges of the flat pieces. The joined pieces can have a neat appearance and is secure, with only one continuous seam. The clamping device can provide a unique edge joining process providing a seamless one-piece appearance in an easy-to-performed process. The clamping device can be configured to allow inexperienced workers to perform the job with no specialty tools, thus can be widely adaptable due to its low cost process.

In joining boards together, an adhesive can be used at the joining surfaces. A clamping device can be used to secure the boards until the adhesive is dried and the boards are bonded to adjust the position of one board with respect to the other board, or to provide a cosmetic joining interface.

For example, a clamping device can include a support for supporting a first panel, including a secure mechanism to secure the panel to the support. The clamping device can include a clamp, which can have a coupling mechanism to the support. The clamp can be configured to hold a second panel, which is supposed to join with the first panel supported by the support. The clamp can have moving mechanisms to adjust the position of one board with respect to the other board, e.g., changing relative positions of the boards, such as moving the second board while the first board is secured to the support, so that the interface at the joint can appear to be seamless, e.g., providing an aesthetic looking interface.

The clamping device can form adjoining pieces in a work surface equipment, such as countertops, backsplash in countertops, and any work surface equipment. The clamping device can be used to form a work surface equipment that includes a work space surface, such as a furniture like a table, a countertop, a bench, or a desk. The equipment can include a substantially horizontal surface panel used as a work space. The equipment can also include substantially vertical edge panels coupled to the horizontal surface panel at the edges of the surface panel. For example, the edge panels can extend downward at the edges of the surface panel, for example, to hide connection coupling or fitting at the underside of the surface panel. The edge panels can also give the surface panel a thicker appearance.

The clamping device can be used to join panels without registration marks and still offer a strong and virtually imperceptible finished seam. For example, the panels can be cut at an angle, such as 45 degrees or a little less than 45 degrees to accommodate the adhesive coating. It is not necessary to perform other cutting or preparation of the panels. The panels can be mounted on the clamping device, and a worker can adjust the clamping device to achieve a desired joint between the panels. The clamping device can keep the panels in place until the adhesive is set. Afterwards, the joined panels can be removed from the clamping device.

The clamping device can allow tryout or testing for the joining of the panels, e.g., without the use of the adhesive. The clamping device can also allow ease of repeating the operation. Thus, once a fit is determined to be satisfactory, the clamping device can be partially loosened, and a coating of adhesive can be placed on the joint. The clamping device then can be re-set, setting again to achieve a seamless joint. Since the clamp has been set before, the re-setting process can be fast, without or with only minor adjustment. After the adhesive is bonded, the clamping device can be removed.

FIGS. 1A-1D illustrate individual panels and joined panels to form a work surface equipment according to some embodiments. In FIG. 1A, 3 panels 110, 111, and 112 are configured to be joined at mitered edges to form a work surface equipment 100, e.g., an equipment, such as a bench, a countertop, a table, or a furniture that has a surface on which works can be performed. The panels can include a top panel 110, which can be horizontal to form a work surface. The panels can include side panels 111 and 112, which can be vertical, and joined with the top panel 110 at an edge. The side panels can be joined to form a right angle with the top panel, which can make the top panel looked thicker.

Each panel can have one or more beveled edges, with each beveled edge having a direction along the beveled edge, together with two directions perpendicular to the direction along the beveled edge. For example, panel 110 can have a beveled edge 110A. The beveled edge 110A can have a direction 110B along the beveled edge. The directions perpendicular to the direction along the beveled edge can include a direction 110D perpendicular to the panel 110, and a direction 110C parallel to the panel 110.

FIG. 1B shows the panels joined together to form the work surface equipment 100. The top joined edges 113, e.g., the sides of the joined edges at the top surface exposed to the user, e.g., at the work surface of the work surface equipment, can be seamless, e.g., having a neat appearance such as a smooth transition from the horizontal surface of the top panel to the vertical surface of the side panel. The bottom joined edges 114, e.g., the sides of the joined edges at the under surface, e.g., at the surface that is normally not being seen by the user, can be unimportant.

In joining two panels, the beveled edges of the two panels are aligned together. Thus the joined panels have a same direction along the beveled edges, e.g., two joined panels can have one direction along the two joined beveled edges.

FIG. 1B shows a panel 110, such as a countertop, having side panels 111 and 112 dropping from the top surface of the countertop. The bonding surface of two panels, such as the bonding of a mitered edge of panel 110 with another mitered edge of panel 111, can form a bonding edge of the panels 110 and 111. The bonding edge can have an outer edge 113, which is the edge exposed to a larger angle. For example, panels 110 and 111 can form a 90 degree angle, e.g., the panels can be said to form a smaller angle of 90 degrees and to form a larger angle of 270 degrees. The outer edge 113 is the edge exposed to the larger angle of 270 degrees. Similarly, the inner edge 114 is the edge exposed to the smaller angle of 90 degrees.

Thus, the outer edge 113 of the joint beveled edges is the cosmetic edge or the visible edge, e.g., the corner of the joint that is visible to the user and desired to have a cosmetic appearance. The opposite joint edge 114 is the inner edge, or the hidden edge, whose appearance is not critical since it is not visible to the user.

Typically, the panels are mitered panels, e.g., panels having side surfaces that are 45 degrees to the top or bottom surface. Thus, the mitered panels can be assembled to form 90 degree corners, e.g., the side panel is perpendicular to the top panel. Other edge panels can be used, such as beveled panels or chamfer panels, e.g., panels having side surfaces that are not perpendicular to the top or bottom surface. The whole surface of the side surface can be flat, e.g., beveled edges, or angled, e.g., chamfer edges.

In general, the panels can be assembled to form corners of any degrees, e.g., from flat panels having 180 degree joint, to obtuse angle joints, to square angle joints, and to acute angle joints, in either direction. Thus, the corners can have from zero degree joint to 360 degree joints. In addition, the seamless joint can be the outer side or the inner side.

FIG. 1C(a)-1C(c) show configurations for joint panels having seamless joints 113 in the inner side of the joint panels, e.g., in the area of less than 180 degrees formed by the panels. The inner side joint panels can be used as splashguard for a countertop.

FIG. 1D(a)-1D(b) show configurations for joint panels having seamless joints 113 in the outer side of the joint panels, e.g., in the area of greater than 180 degrees formed by the panels. The outer side joint panels can be used to give a thicker appearance for the countertop, together with addition room under the countertop for hiding water connection, for example. The opposite joints 114 are not critical, since they are not in the view of the user.

FIGS. 1C(a) and 1D(a) show configuration of square edge panels, in which the panels can have square edges. A small cut on the square edges can be used, for example, to form an angle gap at the joint corner to accommodate an adhesive material. The angled gap is touched, e.g., the vertex of the angled gap, at the seamless joint 113, since any visible gap between the panels can affect the cosmetic appearance of the joint panels. The angled gap is open at the opposite side 114, since this area is hidden from view.

FIGS. 1C(b) and 1D(b) show configuration of 45 degree beveled edge panels, in which the panels can have the whole sides of the edges cut at 45 degree angles. Thus, the 45 degree beveled edge is similar to the mitered edge. The beveled edges can have different degree angles, to form corners of different than square corners. Also, the beveled edges of the beveled panels that form the joint corner can have different angles.

FIG. 1C(c) shows a configuration of 45 degree chamber edge panels, in which the panels can have a portion of the edge sides cut at 45 degree angles.

The terms "mitered edge", "beveled edge", and "chamfer edge" are used interchangeably in the present specification, and means to describe a panel having a side edge that can be flat (e.g., beveled edge) or may not be flat (e.g., chamber edge), or a panel having a side edge that is perpendicular to the top or bottom surface (e.g., a square edge) or a side edge that is not perpendicular to the top or bottom surface (e.g., a beveled or chamfer edge).

FIGS. 2A-2C illustrate flow charts for joining panels according to some embodiments. In FIG. 2A, operation 200 provides two plates each having a beveled edge. Operation 210 attaches the two beveled edges of the two plates, with the attaching configured to provide a cosmetic joined edge.

In FIG. 2B, operation 230 applies glue to beveled edges of two plates. Operation 240 secures the two glued beveled edges together to form a cosmetic joined edge.

In FIG. 2C, operation 260 positions two plates so that sides of beveled edges of the two plates are in contact with a cosmetic joined interface. Operation 270 operates a clamp so that the two plates are separated from each other, with the clamp configured to move at least one plate at a repeatable precision. Operation 280 applies glue to the beveled edges and operating the clamp to secure the two beveled edges.

Figure 3B:
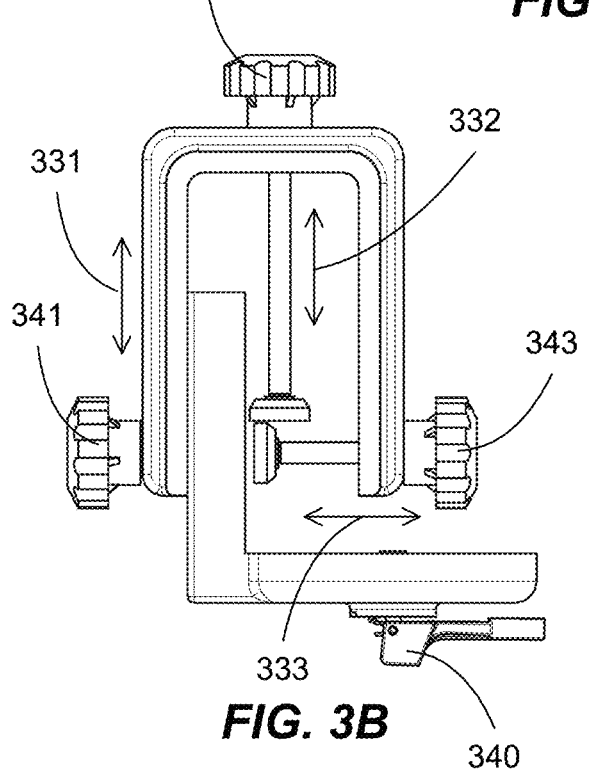
Figure 3C:
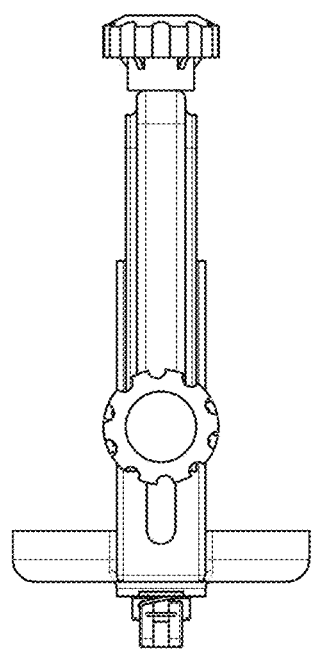

FIGS. 3A-3C illustrate a clamping device according to some embodiments. FIG. 3A shows a perspective view, and FIGS. 3B and 3C show side views of a clamping device 300. The clamping device 300 can include a support for the panels that are to be bonded together. The support can include two support elements 320 and 321, which are disposed at an angle, such as at a right angle. Thus, when two panels are placed on the support elements, the panels are to be bonded at the angle defined by the two support elements.

The support element 320 can include a secure mechanism 340, which can be configured to secure a panel placed on the support element. For example, the secure mechanism 340 can include a vacuum suction assembly, which can remove air from under the panel, and which can secure the panel to the support element.

The clamping device can include a body 322, which is movably coupled to a support element, such as support element 321. The body 322 can be movable 331, for example, to enlarge a distance to the panel disposed on the support element 320 to accommodate a width of the panel disposed on the support element 321. A secure mechanism 341, such as a lock screw, can be used to secure the movable body, e.g., locking the body with the support element 321.

The clamping device can include a secure mechanism 342, which can be coupled to the body to secure a width of the panel on the support element 321. The secure mechanism 342 can be movable 332 to accommodate the width of the panel, for example, by enlarging a distance to the panel, and to secure the panel, for example, by reducing the distance until the panel is secure.

The clamping device can include a secure mechanism 343, which can be coupled to the body to secure a thickness of the panel on the support element 321. The secure mechanism 343 can be movable 333 to accommodate the thickness of the panel, for example, by enlarging a distance to the panel, and to secure the panel, for example, by reducing the distance until the panel is secure.

Figure 4A:
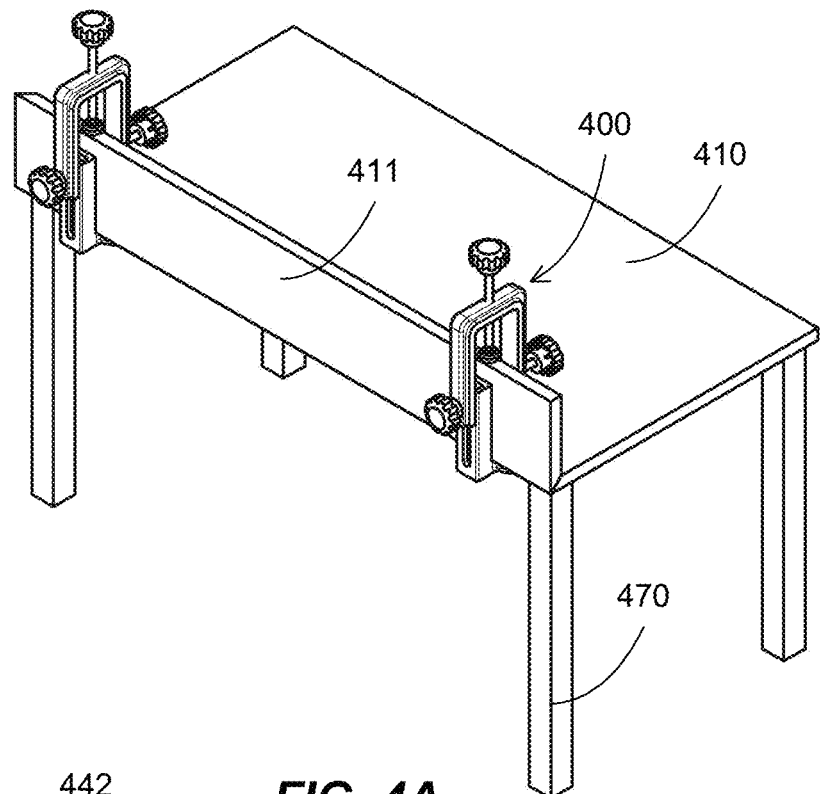
FIGS. 4A-4B illustrate a configuration for attaching two panels according to some embodiments.
Figure 4B:
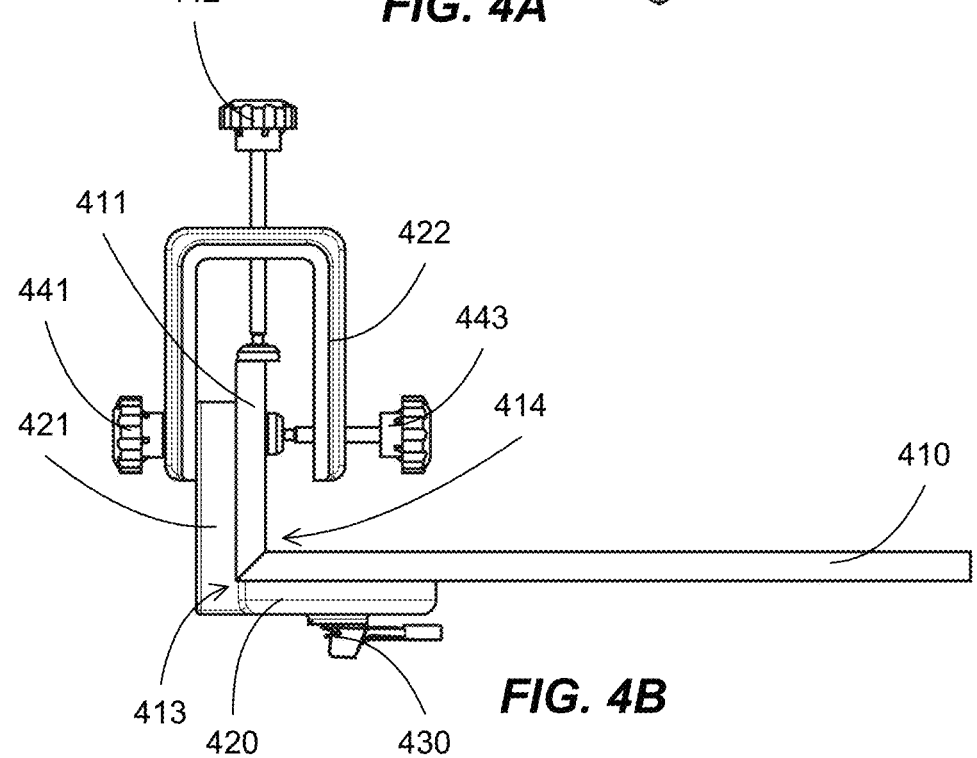

FIGS. 4A-4B illustrate a configuration for attaching two panels according to some embodiments. FIG. 4A shows a perspective view, and FIG. 4B shows a side view of a clamping configuration. Two clamping devices 400 can be used to secure a side panel 411 to a top panel 410, along a length of the panels. The clamping devices can be placed on a large support 470, such as a table. The top panel can be placed on the support elements 420 of the clamping devices. Vacuum mechanism 430 can be activated to secure the top panel to the clamping devices.

A side panel 411 can be placed on the support element 421, and interfaced with the top panel 410 at a mitered edge. The body 422 of the clamping device can be adjusted, and then secured with the secure mechanism 441. The width of the side panel can be secured using a secure mechanism 442. The thickness of the side panel can be secured using a secure mechanism 443.

An end 413 of the mitered edge bonding can be observed to provide a seamless bonding, e.g., a cosmetic pleasing transition between the surfaces of the top and side panels. An opposite end 414 is under the panels, and thus not cosmetically important.

After the bonding of the side and top panels, the clamping devices can be removed, and the completed work surface equipment, e.g., the top panel bonded to the side panel, can be flipped over to be installed at the end location.

FIGS. 5A-5B illustrate flow charts for forming a clamp and a method to operate the clamp according to some embodiments. In FIG. 5A, operation 500 forms a clamp for securing two plates along beveled edges. The clamp can include a first support having a first securing mechanism for support a first plate. The clamp can include a second support coupled to the first support to secure a second plate against the first plate according to a desire configuration. The clamp can include a movable second securing mechanism for securing the second plate. The movable second securing mechanism can be configured to be movable relative to the second support to accommodate different lengths of the second plate. The movable second securing mechanism can include a first securing element for securing the second plate with the second support. The movable second securing mechanism can include a second securing element for securing the beveled edges of the second plate with the beveled edges of the first plate.

In FIG. 5B, operation 520 places and secures a first plate on a first support of a clamp. Operation 530 optionally adjusts a movable mechanism attached to a second support of the clamp to accommodate a second plate. Operation 540 places the second plate on the second support. Operation 550 secures the second plate to the second support and to the first plate.

In some embodiments, a side panel can be bonded to a top panel to provide a thicker appearance and to hide fittings under the top panel. Thus, the side panel can be bonded to the top panel below the working surface of the top panel.

In some embodiments, a clamping device can be configured to bond the side panel to the top panel in a same configuration as the finished product. This configuration can eliminate the flipping of the work surface equipment. The clamping device can also support the panels at locations away from the bonding edges. Thus, the bonding interface can be exposed, so that a worker can observe the interface to ensure that the interface is seamless with a smooth transition between the two surfaces of the two panels. Additional moving mechanisms can be added to allow relative movements of the panels to ensure a fitting along the bonding edges.

FIGS. 6A-6D illustrate a clamping configuration according to some embodiments. The clamping actions can be far away from the bonding edges, as to expose the bonding edges. Further, the panels are arranged as in the configuration of the finished product, thus, when the adhesive is set, the clamping device can be removed, and the product is ready to use without any additional movement, such as without the need for flipping over the product. The panels can be heavy panels, such as made from hard wood or granite, thus the finished product can be heavy, and flipping over would require a significant added labor.

The panels are configured to be assembled to have a cosmetic outer edge 613, e.g., having a cosmetic appearance at the joint edge of the two panels that is exposed to the larger angle, e.g., to the 270 degree angle side.

Figure 6A:
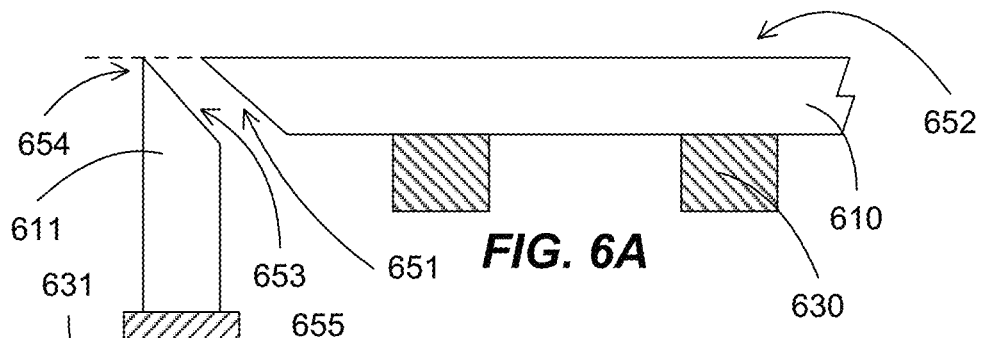
FIGS. 6A-6D illustrate a clamping configuration according to some embodiments.

In FIG. 6A, a top panel 610 can be supported by supporter 630, away from the bonding edge 651. The top panel is also placed with the upside up, e.g., the top surface 652 (the surface on which work is to be performed) is in view of the user. A side panel 611 can also be supported away from the bonding edge 653, such as at the opposite side edge of the bonding edge. A first movement mechanism 631 can be coupled to the side panel to move the side panel in a first direction, which can be perpendicular to the direction along beveled edges of the panels.

The first direction can be up and down 641, e.g., in any direction having a vertical component, and can be in the direction perpendicular to the top panel 610, e.g., perpendicular to the top panel and to the direction along the beveled edge of the top panel. The up/down movement can allow a top alignment of the side panel with the top panel, e.g., the uppermost corner 654 of the side panel is moved as to be flushed with the top surface 652 of the top panel. In some cases, the uppermost corner can be a little lower than the top surface, as to form a smooth transition between the top surface and the outer surface of the side panel.

Figure 6B:
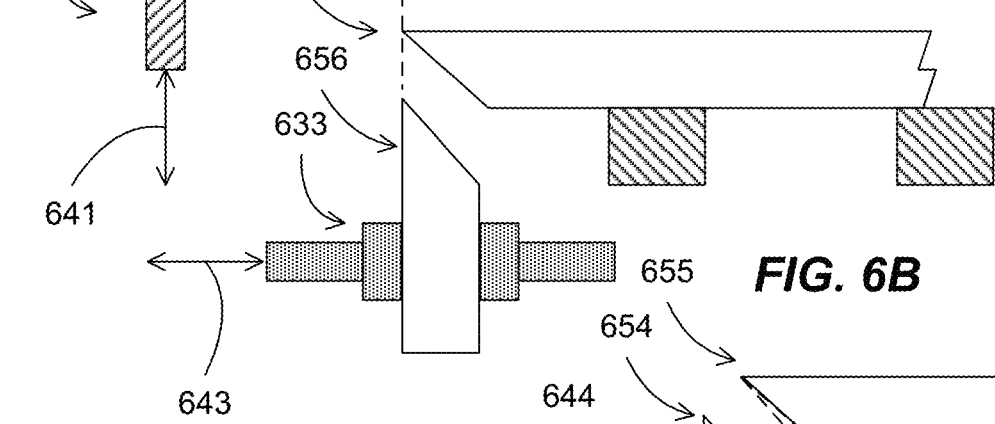

In FIG. 6B, a second movement mechanism 633 can be coupled to the side panel to move the side panel in a second direction, such as perpendicular to the first direction and also perpendicular to the direction along the beveled edge, e.g., sideway 643, such as in any direction having a horizontal component. The sideway movement can allow a side alignment of the side panel with the top panel, e.g., the side panel is moved so that the farthest corner 655 of the top panel is flushed with the outer surface 656 of the side panel. In some cases, the farthest corner can be a little inward, e.g., to the right using the orientation as shown, than the outer surface, as to form a smooth transition between the top surface and the outer surface of the side panel.

Figure 6C:
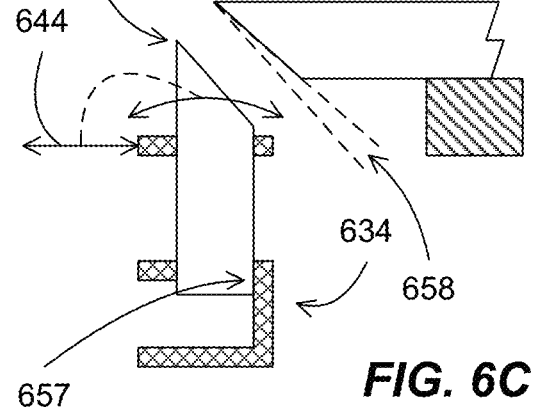

In FIG. 6C, a third movement mechanism 634 can be coupled to the side panel to move the side panel in a third direction, such as rotating in an axis of rotation that is the direction along the beveled edge, which can be perpendicular to the first and second directions, e.g., linear movement 644 around a fixed center 657 to turn the side panel. The rotation movement can allow an alignment of the corner 654 of the side panel with the corner 655 of the top panels, e.g., to flush the two corners 654 and 655 to form an interface 613 having a smooth transition between the top surface 652 of the top panel and the outer surface 656 of the side panel, at the location that exposed to the user eyes. The interface 613 can be called a visible edge or cosmetic edge of the bonding edge, since it is designed to provide a cosmetic appearance visible to the user.

Since the panels are coated with an adhesive for bonding the two edges, a small separation between the bonding surfaces is needed to accommodate the adhesive coating. The side panel can be rotated so that the corners 654 and 655 are touching each other, while leaving a gap 658 at the opposite corners 614 of the side and top panels. The gap can provide the space for the adhesive coating. The opposite corner 614 can be called a hidden edge or an opposite edge of the cosmetic edge, since it is hidden and opposite from the cosmetic edge.

Thus, in some embodiments, the beveled edges, e.g., the mitered edges, of the top and side panels can be not exactly 45 degrees, but a little smaller, such as between 40 and 45 degrees, as to provide the gap while keeping the top and side panels at a right angle. In general, the top and side panels can be bonded to form an angle, which could be a right angle or an acute or obtuse angle. The beveled edges of the top and side panels can be made of smaller angles, e.g., the sum of the beveled angles of the top and side panels can be made a little smaller than the desired angle, as to accommodate an adhesive coating.

Figure 6D:
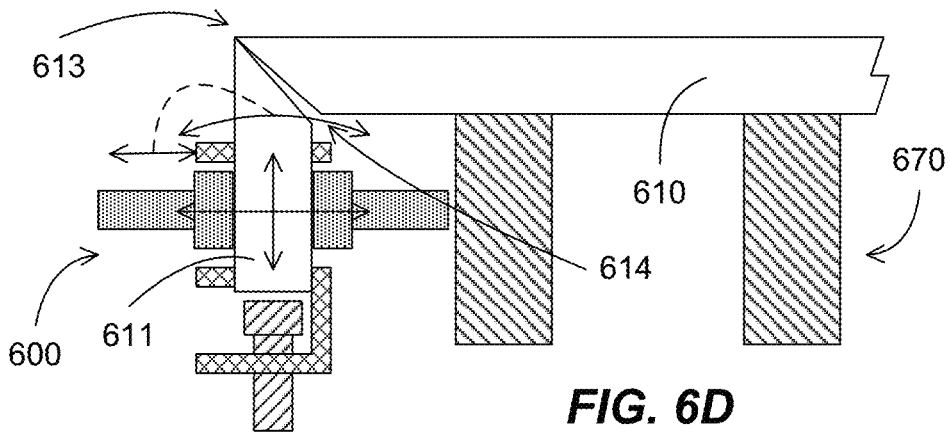

FIG. 6D shows a clamping device 600 incorporating the movements of the panels. The clamping device 600 can include a support 670 for supporting the top panel. A securing mechanism, not shown, can be included to secure the top panel to the support. In some embodiments, for heavy panels, the securing mechanism can be accomplished by the weight of the panel, e.g., with heavy enough panel, the panel is not easy to move.

The clamping device 600 can include an up/down mechanism, a sideway mechanism, and a rotating mechanism to move the side panel 611 relative to the top panel 610.

In some embodiments, a side panel can be bonded to a top panel to provide a barrier for the working surface of the top panel, such as a backsplash for a countertop. Thus, the side panel can be bonded to the top panel above the working surface of the top panel. In this configuration, the seamless interface can be the inner edge or inner corner, e.g., the corner of the top surface of the top panel with a surface of the side panel.

FIGS. 7A-7D illustrate a clamping configuration according to some embodiments. The clamping actions can be configured to provide a smooth transition for an inner corner 713 between the top surface of the top panel and a surface of the side panel.

FIG. 7A shows a clamping device 700 incorporating movements of the panels. The clamping device 700 can include a support 770 for supporting a top panel 710. An optional securing mechanism, not shown, can be included to secure the top panel to the support. The clamping device 700 can include an up/down mechanism, a sideway mechanism, and a rotating mechanism to move a side panel 711 relative to the top panel 710, to provide a smooth interface 713 between top surface 752 of the top panel and surface 756 of the side panel, and a gap 714 to accommodate an adhesive coating.

In FIG. 7B, the top panel 710 can be supported by supporter 730, away from the bonding edge 751. The top panel is also place with the upside up, e.g., the top surface 752 (the surface on which work is to be performed) is in view of the user. A side panel 711 can also be supported away from the bonding edge 753. A first movement mechanism 731 can be coupled to the side panel to move the side panel in a first direction, such as up and down 741. The up/down movement can allow a top alignment of the side panel with the top panel, e.g., the uppermost corner 754 of the side panel is moved as to be flushed with the top surface 752 of the top panel. In some cases, the uppermost corner can be a little higher than the top surface, as to form a smooth transition between the top surface and the outer surface of the side panel.

In FIG. 7C, a second movement mechanism 733 can be coupled to the side panel to move the side panel in a second direction, such as perpendicular to the first direction, e.g., sideway 743. The sideway movement can allow a side alignment of the side panel with the top panel, e.g., the side panel is moved so that the corner 755 of the top panel is flushed with the surface 756 of the side panel. In some cases, the corner can be a little inward, e.g., to the right using the orientation as shown, than the surface 756, as to form a smooth transition between the top surface and the surface 756 the side panel.

In FIG. 7D, a third movement mechanism 734 can be coupled to the side panel to move the side panel in a third direction, such as rotating in an axis of rotation that is perpendicular to the first and second directions, e.g., linear movement 744 around a fixed center 757 to turn the side panel. The rotation movement can allow an alignment of the corner 754 of the side panel with the corner 755 of the top panels, e.g., to flush the two corners 754 and 755 to form an interface 713 having a smooth transition between the top surface 752 of the top panel and the surface 756 of the side panel, at the location that exposed to the user eyes.

Since the panels are coated with an adhesive for bonding the two edges, a small separation between the bonding surfaces is needed to accommodate the adhesive coating. The side panel can be rotated so that the corners 754 and 755 are touching each other, while leaving a gap 758 at the opposite corners 714 of the side and top panels. The gap can provide the space for the adhesive coating.

Thus, in some embodiments, the beveled edges, e.g., the mitered edges, of the top and side panels can be not exactly 45 degrees, but a little smaller, such as between 40 and 45 degrees, as to provide the gap while keeping the top and side panels at a right angle.

Figures 8A, 8B:
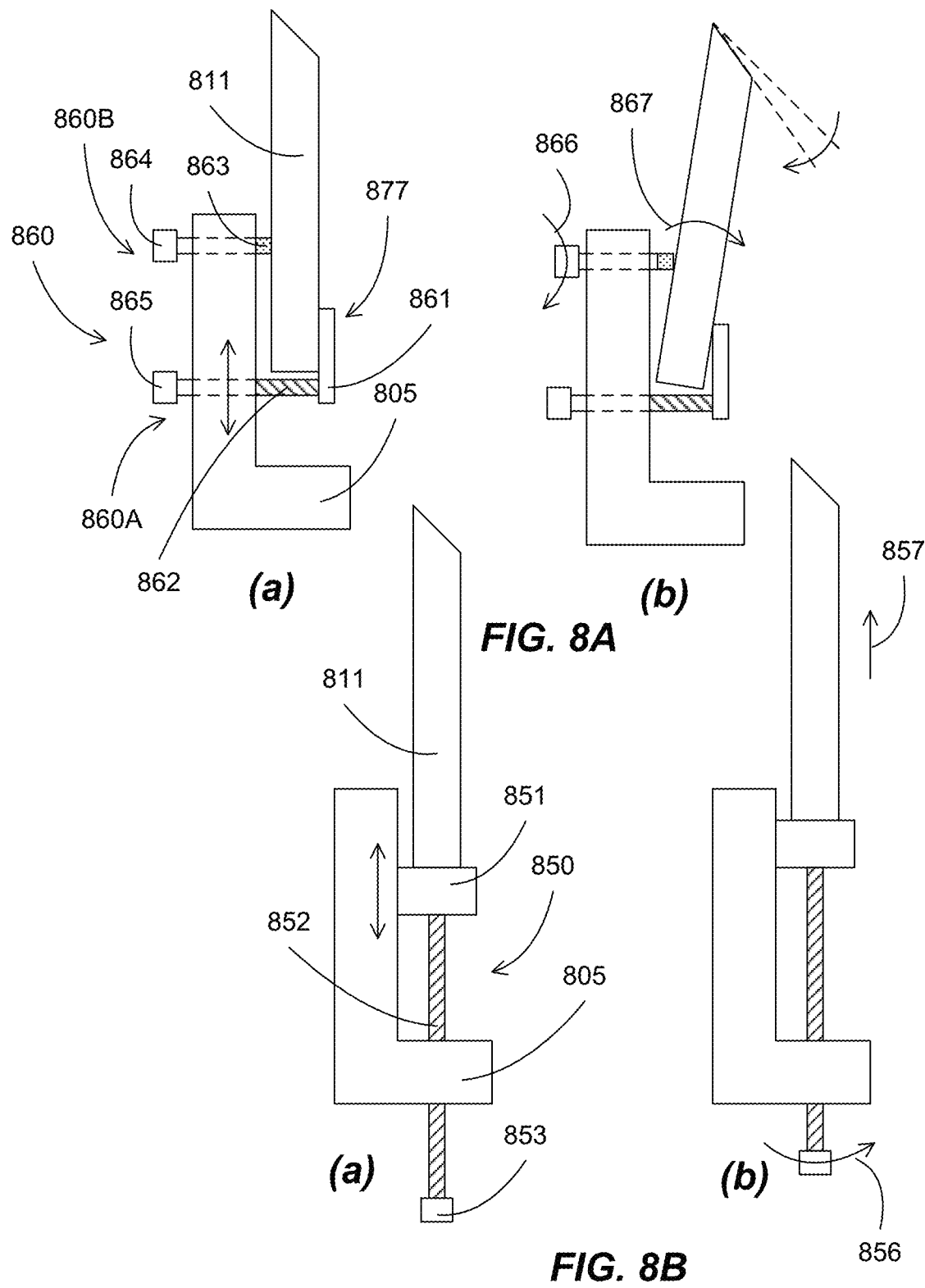
FIGS. 8A-8B illustrate detailed movements of the moving mechanism of a clamping device according to some embodiments.

FIGS. 8A-8B illustrate detailed movements of the moving mechanism of a clamping device according to some embodiments. FIGS. 8A(a) and (b) show a rotating mechanism 860, which can rotate a side panel 811. The rotating angle can be small, in order of a few degrees, such as less than 5 degrees, or less than 3, 2, or 1 degree, depending on the thickness of the side and top panels. The rotating angle can serve to leave an angular gap at the interface of the edges of the side and top panels. The separation of the angular gap can be small, such as enough to accommodate the adhesive coating. Thus, depending on the adhesive, the separation of the angular gap can be a few millimeters, such as less than 5, 4, 3, 2, or 1 mm. Since the gap is an angular gap, the dimension of the separation can be the average separation, or the maximum separation.

In some embodiments, the rotating mechanism can be configured to perform a small rotation of less than 10 or 5 degrees, e.g., the maximum rotating angle performed by the rotating mechanism can be 10 or 5 degrees.

In some embodiments, the rotating mechanism can convert a linear movement to a rotating movement. For example, the rotating mechanism can include a linear movement, applied at a location away from a fixed center of rotation.

The rotating mechanism can include a clamping component 860A for clamping the side panel 811. The clamping component can secure the side panel to a support element 805 of a clamping device. The clamping component can also provide a fixed center of rotation 877 at the clamping point, e.g., a fixed point is created due to the clamping action of the clamping component. The axis of rotation can be the direction along the beveled edge of the panel 811. The clamping component can be movable, e.g., up and down orientation as shown, to accommodate different widths of the side panel.

In some embodiments, the clamping component can include a spring 862, coupled to a clamping element 861 for clamping on the side panel. A securing mechanism 865, such as a knob rotating a long screw, can be coupled to the spring, to secure the clamping component to the body 805. When loosened, the clamping component can slide up and down the body. After accommodating the side panel, the securing mechanism can be tightened, to secure the side panel to the body.

The rotating mechanism can include a rotating component 860B for rotating the side panel 811. In some embodiments, the rotating component can include a support 863 for supporting against the side panel. The support 863 can be made from a flexible material, such as rubber. A moving mechanism 864, such as a knob rotating a screw, can be coupled to the support, to push the support to the right, or to pull the support to the left, in the orientation as shown in the figure.

The support can push on the panel, when the moving mechanism 864 moves the support 863 to the right, for example, by rotating 866 the knob to advance the screw and the support. Since the panel is also supported by the clamping component, the panel is thus rotated 867. If the side panel is flushed against the top panel, this rotation can rotate the side panel to form an angular gap to accommodate the adhesive coating.

FIGS. 8B(a) and (b) show a moving mechanism 850, which can move a side panel 811, for example, in a direction perpendicular to the direction along the beveled edge and also perpendicular to the other panel (e.g., the top panel). This direction can be up and down direction. The movement of the side panel can be configured to match the beveled edge of the side panel with the beveled edge of a top panel.

The moving mechanism 850 can include a support 851 for supporting the side panel. The support 851 can be movably coupled to the body 805 of the clamping device, e.g., the support can move up and down. For example, the support can be mounted on a linear guide, which can constrain the support to move only in the vertical direction.

The moving mechanism 850 can include a linear mechanism to move the support. The linear mechanism can include a screw 852 coupled to the body. One end of the screw is rotatably coupled to the support 851. The opposite end of the screw is coupled to a knob 853. When the knob 853 is rotated 856, the screw 852 is also rotated, which can linearly move 857 the support 851.

In some embodiments, the present invention discloses a clamping device for joining panels using an adhesive material. The surface of the joined edge between the two panels can include a cosmetic edge, e.g., the edge of the joined panels that is visible to the user when using the joined panels can be pleased to the eyes. For example, the cosmetic edge can include a smooth joining with no gaps or openings. The surface of the joined edge between the two panels can include a hidden edge, e.g., the edge of the joined panels that is opposite to the cosmetic edge and that is hidden from the user. The hidden edge can have a gap to accommodate the adhesive material. Thus the cosmetic edge and the hidden edge can form an angled opening, e.g., the two panels are touching each other at the cosmetic edge and not touching at the hidden edge.

A panel can have a large top surface and a large bottom surface, surrounded by the smaller side surfaces, such as by 4 side surfaces for a rectangular panel. One large surface, such as the top surface, can be a cosmetic surface, e.g., the working surface of the panel. The opposite surface of the cosmetic surface can be a hidden surface, which is typically a bottom surface.

The panel can have a beveled edge (including chamfer edge or square edge) at a side surface. Two panels can be joined along the beveled edges of the two panels.

The clamping device can include a first assembly configured to support and to move a panel, such as a side panel. For example, a top panel can be placed on a panel support. The side panel can be mounted to the clamping device, with the clamping device configured to move the side panel relative to the top panel. The side panel can be moved so that the beveled edge of the side panel is aligned with the beveled edge of the top panel, e.g., the two panels touch each other at the cosmetic edge of joined edge, and the two panels form a gap at the hidden edge opposite the cosmetic edge.

The first assembly can include a support configured to support the panel. The support can support the panel at a bottom side surface, e.g., at a side surface opposite the beveled edge surface. The support can also support the panel at an area of the large surface of the panel, such as the top or bottom surface. The area can be near the bottom side surface, away from the beveled edge surface.

FIGS. 9A-9C illustrate configuration for an assembly having a support according to some embodiments. The assembly can include a body 905. In FIG. 9A, a support 951 can be configured to support a panel 911A at a bottom side edge, e.g., at a side surface opposite the beveled edge surface 953. The support 951 can be coupled to a plate 961, which can be configured to support an area of a surface of the panel near the bottom side edge. The plate 961 can be coupled to the support 951 through a spring assembly 962, which can be stretched to accommodate panels having different thicknesses, such as panel 911A and panel 911B.

The width of the support 951 can be much smaller than the width of the panel, thus the support 951 can support at a small area of the bottom side surface. In some embodiments, two supports can be used for balancedly support the panel, such as using two clamping devices or one clamping device having two supports.

The width of the plate 961 can be much smaller than the width of the panel, thus the plate 961 can support the panel at a small area. In some embodiments, two plates can be used for balancedly support the panel, such as using two clamping devices or one clamping device having two plates, with each plate coupled to a support or two plates coupled to a support. Alternatively, one plate can be used, since there can be little side force on the panel.

The support 951 can be coupled to a linear guide 958, which can allow the support to move, for example, up and down, which can move the panel also in the same direction, e.g., in the direction defined by the linear guide, such as the vertical direction or a direction having a vertical component.

In FIG. 9B, a support 951B can be configured to support a panel 911 at a bottom side edge. A plate 961B can be coupled to a spring assembly 962B, which is coupled to the body 905 of the assembly at a coupler 965 or 966, which is separated from the support 951B. Thus, the plate 961B and the bottom support 951B are two separate components, with each component coupled to the body. The bottom support 951B can be coupled to the body at a linear guide, which can be coupled to a mechanism to move the panel up and down. The coupler 966, that coupled to the spring assembly 962B that is coupled to the plate 961B that is configured to side support the panel, can be fixed coupled to the body, e.g., the plate 961B can be stationary when the panel moves up or down. This configuration can be used when the panel is near the other panel, e.g., the two beveled edges to be bonded together are close to each other, thus small movements of the panel is adequate for alignment.

The coupler 965, that coupled to the spring assembly 962C that is coupled to a side support plate such as the bent plate 967 that is configured to side support the panel, can be movably coupled to the body, e.g., the bent plate 967 can be manually moved up or down, for example, through a groove 956 in the body, when the panel moves up or down, for example, by an up-down mechanism. This configuration can be used to simplify the support structure, with the bottom support and the side support not connected to each other.

The plate 961 or 961B can have a bent portion, such as side plate 967, which can be configured to contact the panel at a line, instead of a broader area. The line contact can assist a mechanism to rotate the panel, e.g., the line can function as a pivot line, to allow the panel to rotate with the line as the axis of rotation.

In some embodiments, the clamping device can include a first mechanism configured to linearly move a panel, such as a first panel, in a direction toward another panel, such as a second panel, e.g., so that a beveled edge of the first panel approaches a beveled edge of the second panel. For example, the second panel can be disposed horizontally, e.g., parallel to a lateral surface. The first mechanism can be configured to move the first panel in a vertical direction, to form a 90 degree bonding of the two beveled edges.

Figure 10A:
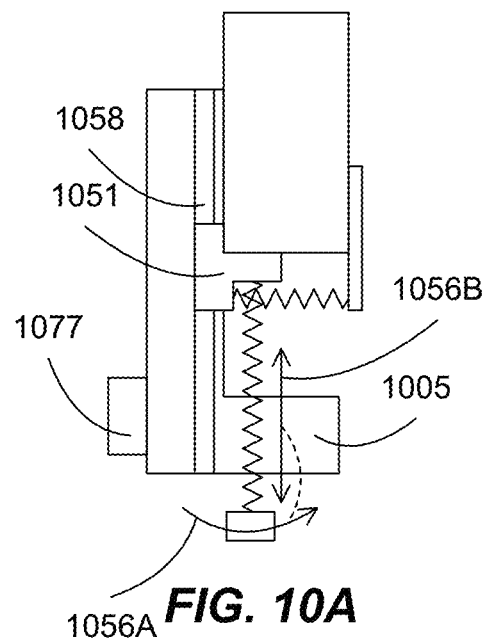
FIGS. 10A-10C illustrate configurations of a mechanism configured to move a panel in a vertical direction according to some embodiments.
Figure 10B:
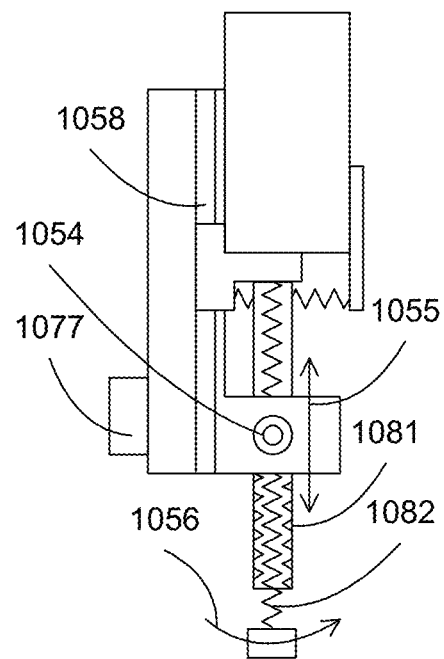
Figure 10C:
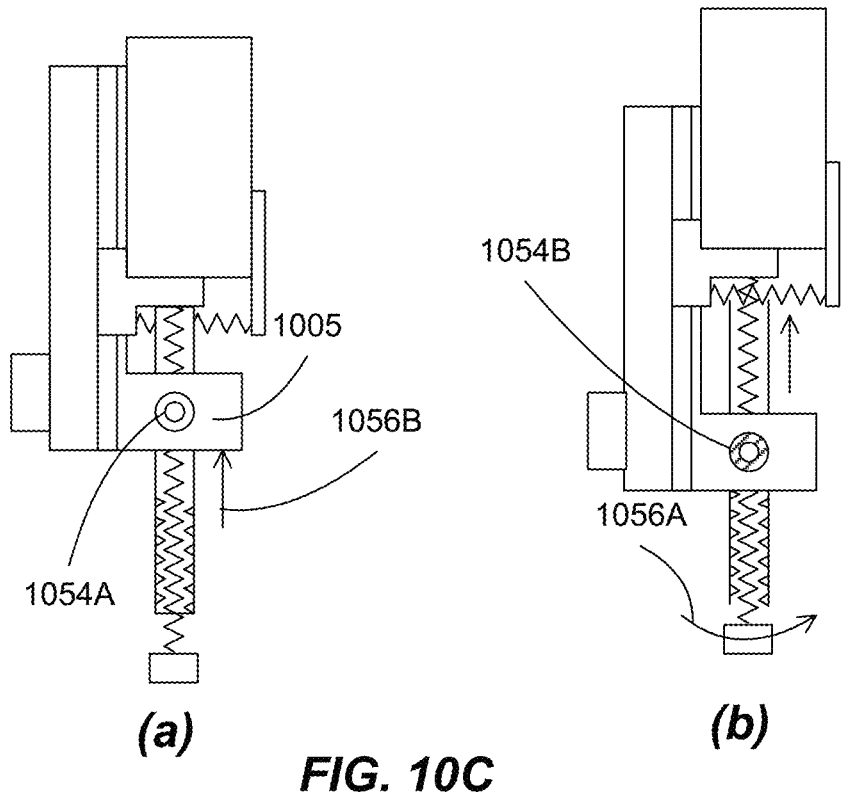

FIGS. 10A-10C illustrate configurations of a mechanism configured to move a panel in a vertical direction according to some embodiments. FIG. 10A shows a mechanism having a fine movement step, e.g., a motion converter that converts a rotational movement into a linear movement. Thus, a full rotation can be converted to a linear movement of one pitch distance of the spiral teeth on the rotating shaft, which can be order of millimeters.

The first mechanism can be coupled to a bottom support 1051, such as a bottom support of a first assembly as described above. When the first mechanism is rotated, the coupling of the rotating shaft with the body of the first assembly can convert the rotational motion 1056A into a linear motion 1056B, which can move the support 1051, for example, up and down along the linear guide 1058. When the support moves up and down, the panel can also move up and down accordingly. In some embodiments, the direction of movement can be the direction perpendicular to the direction along the beveled edge and also perpendicular to the other panel.

The clamping device can further include a laser assembly 1077, which can be coupled to the body 1005 of the assembly. The laser assembly can be configured to provide a laser line parallel to the surface of the other panel, or parallel to the beveled edge of the other panel. Thus the laser line can be used to align the two beveled edges.

FIG. 10B shows a mechanism having a fine movement step using a motion converter with a rotational movement, together with a coarse movement step using a linear movement. The coarse movement step can move the bottom support, and the panel, at a larger step than the fine movement step. For example, the coarse movement step can move the bottom support in steps of order of centimeters, e.g., tens of millimeters, such as 1, 2, or 5 cm, while the fine movement step can move the bottom support in steps of order of millimeters, such as 1, 2, or 5 mm.

For example, the fine movement step can be performed by a motion converter mechanism, which can convert a rotational movement into a linear movement. A full rotation can move a linear distance of a few millimeters, such as 1, 2 or 3 mm. The coarse movement step can be performed by a linear movement, such as a push or pull motion to move the bottom support or the panel. A push or pull motion can move a linear distance of a few centimeters, such as 1, 2, or 3 cm.

In some embodiments, the fine movement step can be used to align the beveled edges, e.g., gradually and with fine steps to move the beveled edge of the panel clamped by the clamping device to align with the beveled edge of another panel. The small step movement is needed to ensure that the two beveled edges are close to each other, e.g., not too close to damage the beveled edges and not too far apart to leave a gap and to provide a seamless cosmetic pleasing bonding edge.

In some embodiments, the coarse movement step can be used to apply the adhesive material. For example, after the beveled edges are aligned, using the fine movement step mechanism, the panel can be moved apart, using the coarse movement step mechanism, to separate the two beveled edges, for example, at a distance large enough for the application of an adhesive material, such as 1, 2 or 3 cm apart. The adhesive material can be applied to one or both beveled edges. The coarse movement step mechanism can be activated again, to move the panel to the previously aligned position, this time with the adhesive to bond the two beveled edges.

The mechanism can include a locking element to disengage the coarse movement step and to engage the fine movement step. For example, the coarse movement step configuration can include a portion that can move linearly. The locking element can lock the portion to enable the fine movement step configuration.

The mechanism can include two concentric elements coupled to the body 1005 of an assembly configured to support the panel, such as an assembly having a bottom support. The two concentric elements can include an outer concentric element 1081, which is configured to move panel, such as through the bottom support, in the coarse step configuration, for example, by pushing or pulling on the outer concentric element in a vertical direction 1055. The outer concentric element can be an outer tube coupled to the body 1005, and can contact the bottom support.

The inner concentric element can be configured to move the second assembly in the fine step configuration, such as a motion converter converting a rotational movement to a small linear movement. For example, the inner concentric element can include an inner rod threaded inside the outer concentric element, such as threaded to the outer tube. One end of the inner concentric element can be coupled to the bottom support.

Thus, when the inner concentric element is rotated against the outer tube, e.g., when the outer tube is fixed coupled to the body 1005, the rotation can be converted to a linear motion to move the bottom support up or down.

In some embodiments, the mechanism can include a locking element 1054, which can secure the outer tube to the body. When the locking element is not engaged, the outer tube can move freely relative to the body. With the inner concentric element threaded inside the outer tube, the inner concentric element can move together with the outer tube, to perform the coarse movement step.

FIG. 10C(a) shows a configuration when the locking element 1054 is in a disengaged status 1054A, e.g., the outer tube 1081 can move relative to the body 1005. The outer tube can be pushed up 1056B, which can move the panel upward. Similarly, when the licking mechanism is loosen, e.g., gradually moving to the disengaged status, gravity from the panel can move the panel downward relative to the body.

When the locking element is engaged, the outer tube can be fixedly coupled to the body. Thus, when the inner concentric element rotates, it rotates through the threads inside the outer tube, which can move the inner concentric element linearly up or down.

FIG. 10C(b) shows a configuration when the locking element 1054 is in an engaged status 1054B, e.g., the outer tube 1081 is fixedly coupled to the body 1005. The inner concentric element 1082 can be rotated 1056A, which can move the inner concentric element upward or downward relative to the fixed outer tube 1081. The linear movements of the inner concentric element can move the bottom support and the panel in the vertical direction.

In some embodiments, the clamping device can include a second mechanism configured to rotate a panel, such as a first panel, in a direction toward another panel, such as a second panel, e.g., so that a beveled edge of the first panel approaches a beveled edge of the second panel. For example, the second panel can be disposed horizontally, e.g., parallel to a lateral surface. The first mechanism can be configured to move the first panel in a vertical direction, to form a 90 degree bonding of the two beveled edges.

FIGS. 11A-11D illustrate configurations of a mechanism configured to rotate a panel in a lateral direction according to some embodiments. FIGS. 11A-11B show a mechanism having a support 1151 that can provide a bottom support, e.g., supporting a bottom side surface of a panel 1111, which is opposite to the beveled edge side of the panel. FIGS. 11A(a) and 11A(b) show different views of a same mechanism. FIG. 11B shows the mechanism after a rotational movement. The support 1151 can also have a side support 1161, e.g., supporting a large surface of the panel, such as a bottom surface, e.g., a hidden surface of the countertop. The side support 1161 can be coupled to the support 1151, for example, through a spring mechanism 1162, which can allow the side support for panels having different thicknesses. The support 1151 can be coupled to a body 1105 of an assembly, such as to be coupled to a linear guide for moving the panel in a vertical direction. The side support can be positioned in a middle of the panel, at or near the bottom support.

A mechanism 1160 can be coupled to the body 1105. The mechanism can include a motion converter configured to convert a second rotational movement to a second linear movement, such as a lead screw or ball screw shaft 1163 rotating against the body. When rotating 1166, the lead screw shaft 1163 can move relative to the body. An end of the lead screw shaft can include a knob 1164, which can be used for rotating. An opposite end of the lead screw shaft can contact the panel, for example, through an end point element such as a rubber cap.

The lead screw shaft can pass through the linear guide 1158, creating an end point for the movement along the linear guide 1158, e.g., the bottom support can not pass through the lead screw shaft.

The motion of the contact point at the end of the lead screw shaft of the mechanism 1160 can push or pull the panel 1111 against the side support 1161, which can cause the panel to rotate 1167 around an axis of rotation 1177 at the end of the side support 1161.

If the side support is a flat plate, contacting the panel at an area on the bottom surface of the panel, the axis of rotation can be the top end of the flat plate 1161, since the lead screw shaft can be pushed at an area above the side support flat plate. If the side support is a bent plate 1161B, which contacts the panel at a line, for example, a line parallel to the horizontal plane, the axis of rotation can be the horizontal line.

The mechanism 1160 can rotate the panel around an axis of rotation parallel to the bonding edges, and thus can create an angled gap between the beveled edges to accommodate the adhesive material.

In some embodiments, the mechanism 1160 is configured to rotate the panel in only one direction, e.g., the direction that can enlarge the angle gap. For example, at the perpendicular configuration, the beveled edge of the panel clamped by the clamping device can match perfectly with the beveled edge of the top panel placed on the panel support. The lead screw shaft of the mechanism 1160 can be rotate to push on the panel, which can rotate the panel in the direction to enlarge the angled gap. Careful operation of the lead screw shaft can be important, since retracting the lead screw shaft might or might not rotate the panel in the opposite direction.

The clamping device can further include a laser assembly 1177, which can be coupled to the body 1005 of the assembly. The laser assembly can be configured to provide a laser line parallel to the surface of the other panel, or parallel to the beveled edge of the other panel. Thus the laser line can be used to align the two beveled edges.

FIGS. 11C-11D show a mechanism having a support 1151B that can provide a bottom support. FIGS. 11A(a) and 11A(b) show different views of a same mechanism. FIG. 11B shows the mechanism after a rotational movement. The bottom support 1151B can be coupled to a linear guide which is coupled to the body 1105. A side support 1161B can be coupled to the body 1105, separate from the bottom support 1151B. The side support 1161B can be coupled to the support 1151B, for example, through a spring mechanism. The side support can include a bent portion for contacting the panel at a horizontal line. The side support can be positioned at one side of the bottom support, e.g., so the movement of the side support does not interfere with the bottom support, or vise versa.

A mechanism can be coupled to the body 1105, including a lead screw or ball screw shaft rotating against the body. When rotating, the lead screw shaft can push on the panel, rotating the panel to enlarge the angled gap between the beveled edges.

Figure 12A:
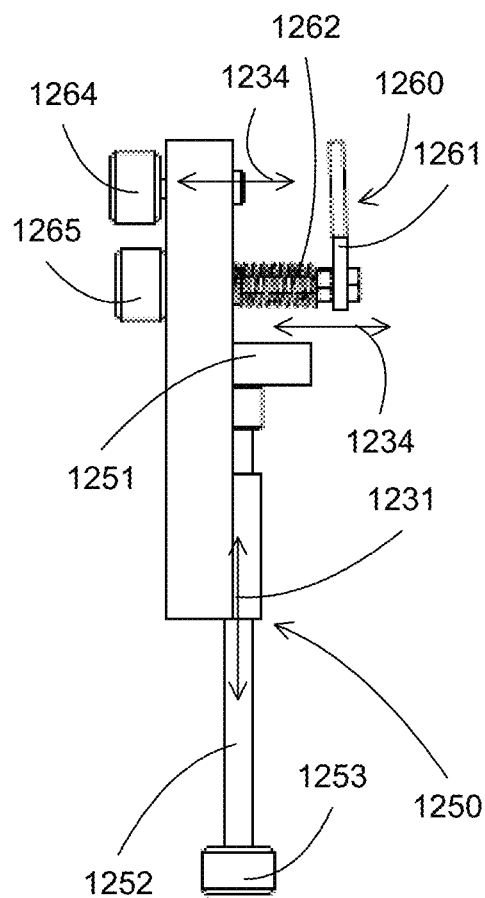
FIGS. 12A-12C illustrate a clamping device according to some embodiments.
Figure 12B:
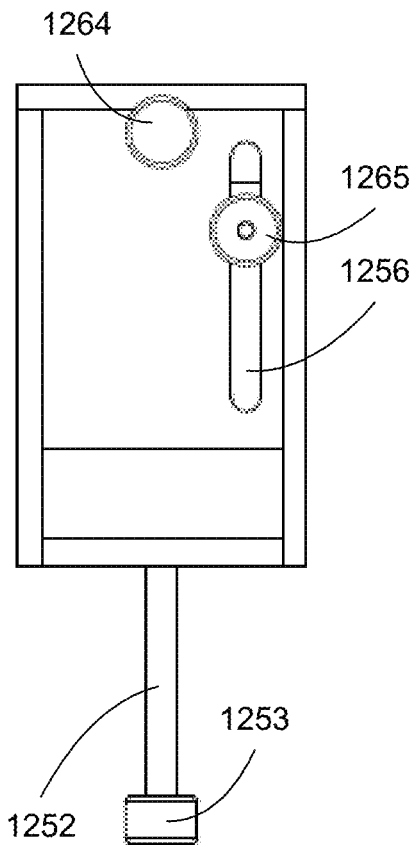
Figure 12C:
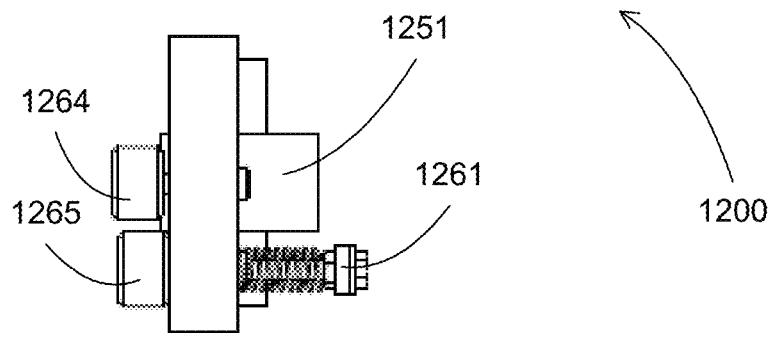

FIGS. 12A-12C illustrate a clamping device according to some embodiments. A clamping device 1200 can include a vertical moving mechanism 1250 (FIG. 12A) to move the side panel in a vertical direction 1231, or a direction having a vertical component. The vertical moving mechanism can include a support 1251 for supporting the side panel. The vertical moving mechanism can include a knob 1253 (FIG. 12B) for rotating a screw 1252, such as a lead screw or a ball screw. The rotation of the screw can move the support 1251 up and down, e.g., in a vertical direction 1231, or in a direction perpendicular to the direction along the beveled edge of the panel, and also perpendicular to the other joined panel.

The clamping device can include a support for the side panel, including a clamp 1261 for clamping the side panel. The clamp can move up and down in a slot 1268, thus can accommodate side panels having different widths, e.g., the distance between the beveled edge and the bottom side surface that is supported by the bottom support 1251. The clamp can form a fixed point at the clamping point. The clamp can be coupled to the clamping device through a spring assembly 1262, thus can accommodate side panels having different thicknesses.

The clamping device can include a rotating mechanism 1260 to rotate the side panel around an axis of rotation perpendicular to the vertical and horizontal directions. The rotating mechanism can include a linear mechanism pushing or pulling 1234 on the side panel to rotate the panel around the fixed point formed by the clamp 1261 (FIG. 12C).

In some embodiments, the clamping device can include a second assembly configured to support and to move the first assembly, which is configured to support and to move a side panel. The first assembly has been configured to move the side panel so that the beveled edge of the side panel approaches the beveled edge of a top panel from a first direction, such as the vertical direction.

The second assembly can be configured to move the first assembly so that the beveled edge of the side panel approaches the beveled edge of the top panel from a second direction perpendicular to the first direction, such as a horizontal direction, or a direction perpendicular to the direction along the beveled edge and also perpendicular to the panel 1311.

The second assembly can include a linear guide coupled to the first assembly. The linear guide can be configured to support and guide the first assembly in the horizontal direction, e.g., to the direction perpendicular to the beveled edges.

The second assembly can include a third mechanism, which is coupled to the first assembly to move the first assembly. The mechanism can be configured to move the first assembly in a fine step configuration and a coarse step configuration. In the fine step configuration, the mechanism can move the first assembly in fine steps, e.g., in smaller steps as compared to the steps of the coarse step configuration. The fine step movement can include a motion converter configured to convert a rotational movement to a linear movement configured to linearly move the first assembly. In the coarse step configuration, the mechanism can move the first assembly in large steps, e.g., in larger steps as compared to the fine steps. The coarse step movement can include a linear movement configured to linearly move the first assembly.

Figure 13A:
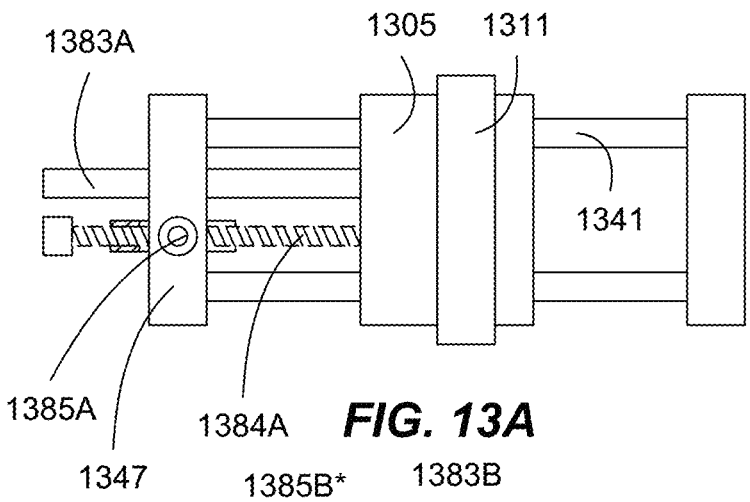
FIGS. 13A-13D illustrate configurations of a mechanism configured to move an assembly in a horizontal direction according to some embodiments.

FIGS. 13A-13D illustrate configurations of a mechanism configured to move an assembly in a horizontal direction according to some embodiments. FIG. 13A shows a mechanism having a fine movement step 1384A, e.g., a motion converter that converts a rotational movement into a linear movement. Thus, a rotation can be converted to a linear movement of the lead screw shaft, which can move linearly the first assembly 1305 having the panel 1311 along the linear guide 1341. The mechanism can also have a coarse movement step 1383A, which can move linearly to move the first assembly 1305.

A locking mechanism 1385A can be used to toggle between the fine and coarse movement steps. For example, by locking the locking mechanism 1385A, the fine movement step is enable, to allow the operation of the fine movement step. By unlocking the locking mechanism 1385A, the coarse movement step is enable, to allow the operation of the coarse movement step.

Figure 13B:
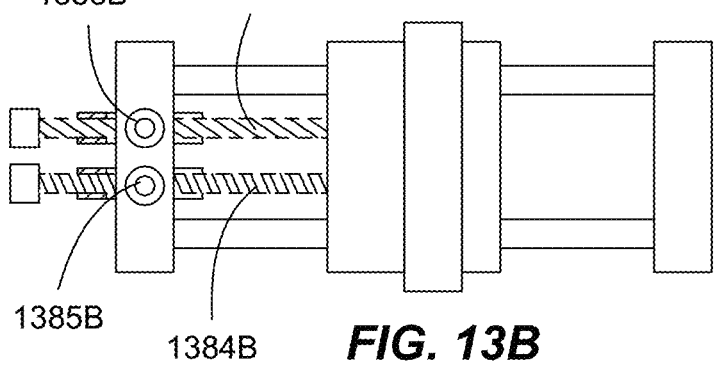

FIG. 13B shows a mechanism having a fine movement step 1384B, e.g., a motion converter that converts a rotational movement into a linear movement. Thus, a rotation can be converted to a linear movement of the lead screw shaft, which can move linearly the first assembly along the linear guide. The mechanism can also have a coarse movement step 1383B, which can include a motion converter that converts a rotational movement into a linear movement. Thus, a rotation can be converted to a linear movement of the lead screw shaft, which can move linearly the first assembly along the linear guide.

A locking mechanism 1385B and 1385B\* can be used to toggle between the fine and coarse movement steps. For example, by locking the locking mechanism 1385B (and unlocking the locking mechanism 1385B\*), the fine movement step is enable, to allow the operation of the fine movement step. By locking the locking mechanism 1385B\* (and unlocking the locking mechanism 1385B), the coarse movement step is enable, to allow the operation of the coarse movement step.

Figure 13C:
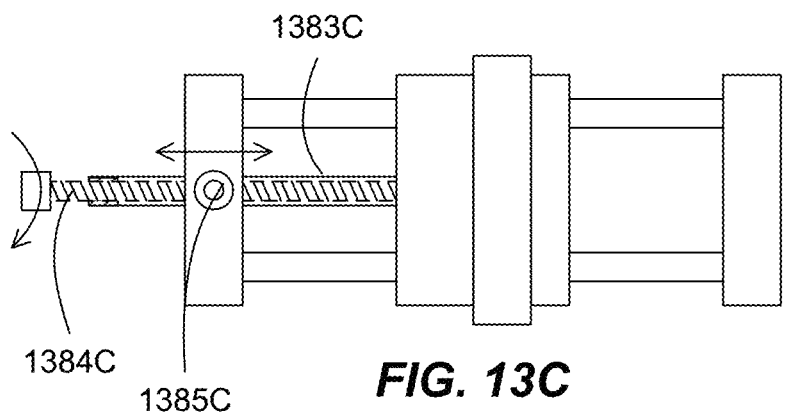

FIG. 13C shows a mechanism having a concentric fine movement step 1384C and coarse movement step 1383C. The fine movement step 1384C can include a motion converter that converts a rotational movement into a linear movement. Thus, a rotation can be converted to a linear movement of the lead screw shaft, which can move linearly the first assembly along the linear guide. The coarse movement step 1383C can move linearly to move the first assembly.

A locking mechanism 1385C can be used to toggle between the fine and coarse movement steps. For example, by locking the locking mechanism 1385C, the fine movement step is enable, to allow the operation of the fine movement step. By unlocking the locking mechanism 1385C, the coarse movement step is enable, to allow the operation of the coarse movement step.

Figure 13D:
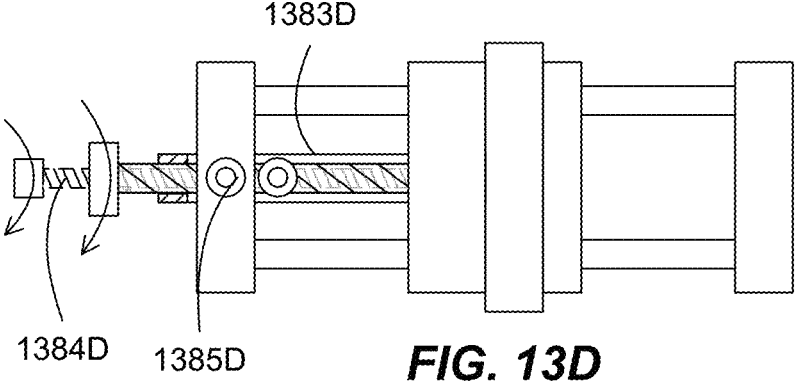

FIG. 13D shows a mechanism having a concentric fine movement step 1384D and coarse movement step 1383D. The fine movement step 1384D can include a motion converter that converts a rotational movement into a linear movement. Thus, a rotation can be converted to a linear movement of the lead screw shaft, which can move linearly the first assembly along the linear guide. The coarse movement step 1383D can include a motion converter that converts a rotational movement into a linear movement. Thus, a rotation can be converted to a linear movement of the lead screw shaft, which can move linearly the first assembly along the linear guide. A locking mechanism 1385D can be used to toggle between the fine and coarse movement steps.

Figures 14A, 14B, 14C:
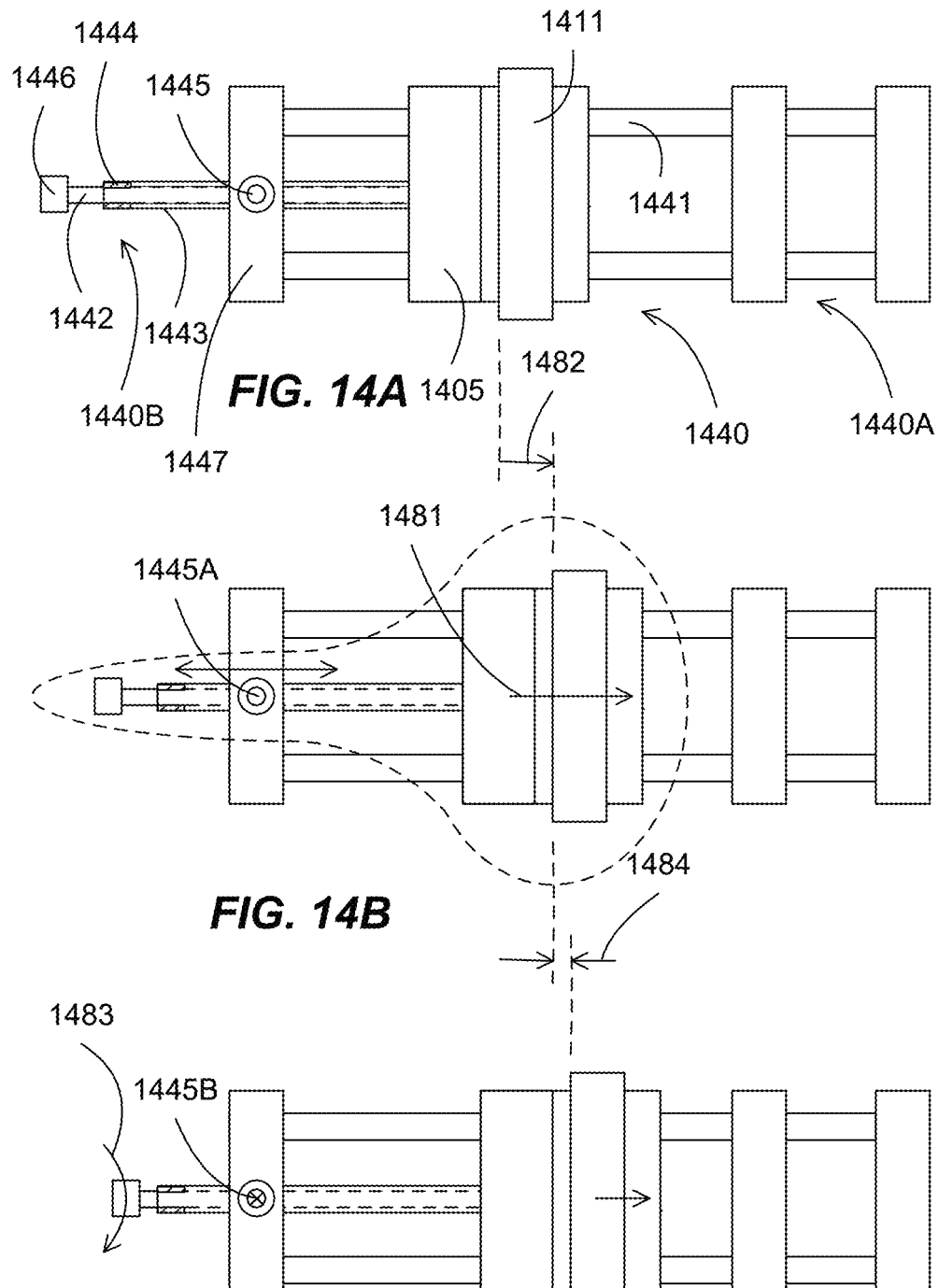
FIGS. 14A-14C illustrate other detailed movements of the moving mechanism of a clamping device according to some embodiments.

FIGS. 14A-14C illustrate other detailed movements of the moving mechanism of a clamping device according to some embodiments. FIG. 14A show a moving mechanism 1440, which can linearly move a side panel 1411 to left and right directions, e.g., to directions perpendicular to another moving mechanism. The moving mechanism 1440 can provide coarse movements, to move the side panel a large distance. The moving mechanism 1440 can also provide fine movements, to move the side panel to approach the top panel to form a smooth seamless interface.

The moving mechanism 1440 can include a linear mechanism 1440A, which can include a guide 1441, on which the body 1405 of the clamping device can slide, e.g., linearly move in the left and right directions. The side panel 1411 can be fixedly coupled to the body 1405, thus when the body moves, the side panel also moves. The movements of the body along the guide 1441 can be performed manually, e.g., by pulling or pushing on the body. The movements of the body along the guide 1441 can provide coarse movements, e.g., moving a large distance for the side panel to approach the top panel.

The moving mechanism 1440 can include a rotating-to-linear mechanism 1440B to provide fine movements to the body 1405. The rotating-to-linear mechanism 1440B can include a knob 1446 for rotating a screw 1442, such as a lead screw or a ball screw. The screw 1442 can be disposed inside a tube 1443, which can have mating gears 1444 for the screw to rotate. Thus, when the knob 1446 rotates, the body 1405 can moves linearly along the guide 1441. The precision of the fine movements can be controlled through the teeth of the screw and the gears The moving mechanism 1440 can include a lock 1445, to switch between the coarse movements and the fine movements. The lock 1445 can secure the tube 1443 with a component 1447 of the linear mechanism 1440A. When the lock is disengaged 1445A, the tube 1443 can move freely with respect to the linear mechanism 1440A. When the lock is engaged 1445B, the tube 1443 is secured with the linear mechanism 1440A.

FIG. 14B shows a coarse movement of the moving mechanism 1440. The lock 1445 is disengaged, e.g., the lock is in an unlocked state 1445A. A worker can move 1481 the body 1405 along the guide 1441. Since the rotating-to-linear mechanism 1440B is secured to the body 1405, and the tube 1443 can freely move with respect to the linear mechanism 1440A, e.g., to the component 1447, the body and the rotating-to-linear mechanism move together. As shown, the body can move to the right a distance 1482, pulling along the rotating-to-linear mechanism, which slides in the component 1447.

FIG. 14C shows a fine movement of the moving mechanism 1440. The lock 1445 is engaged, e.g., the lock is in a locked state 1445B. A worker can rotate 1483 the knob 1446 to advance the screw 1442 along the tube 1443. Since the tube 1443 is secured to the component 1447, e.g., to the linear mechanism 1440A, the tube is fixed, and the screw advances to push the body along the guide 1441. As shown, the body can move to the right a distance 1484, while the linear mechanism 1440A is stationary.

Figure 15A:
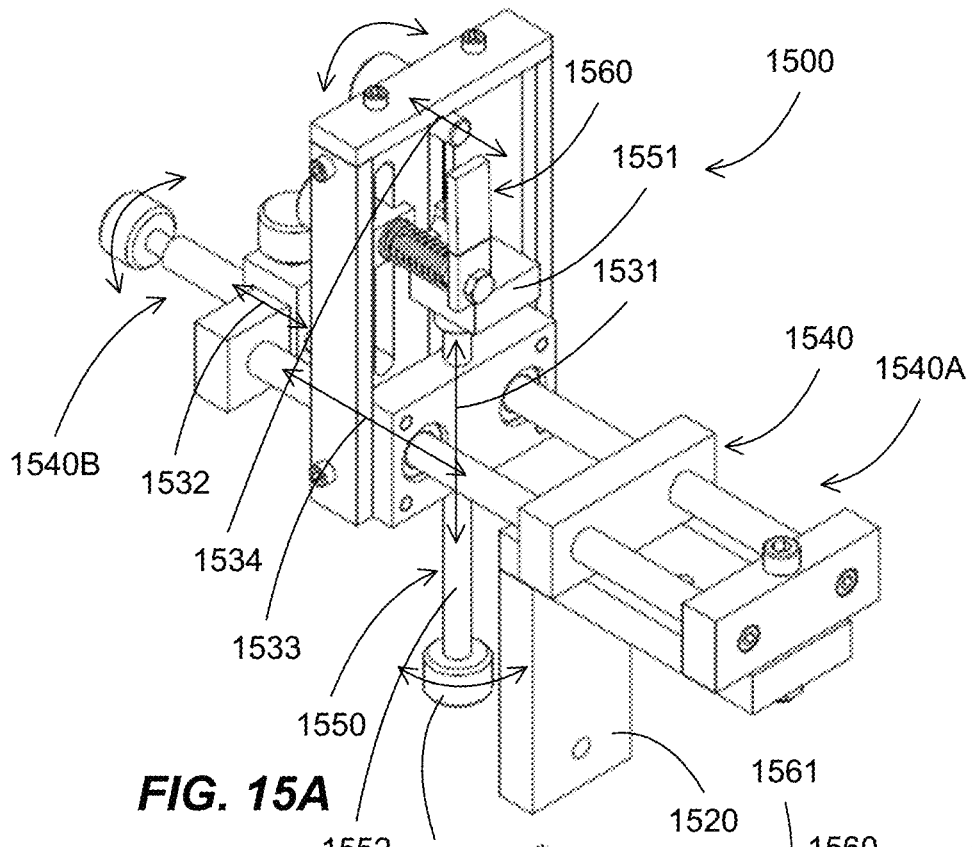
FIGS. 15A-15B illustrate a clamping device according to some embodiments.
Figure 15B:
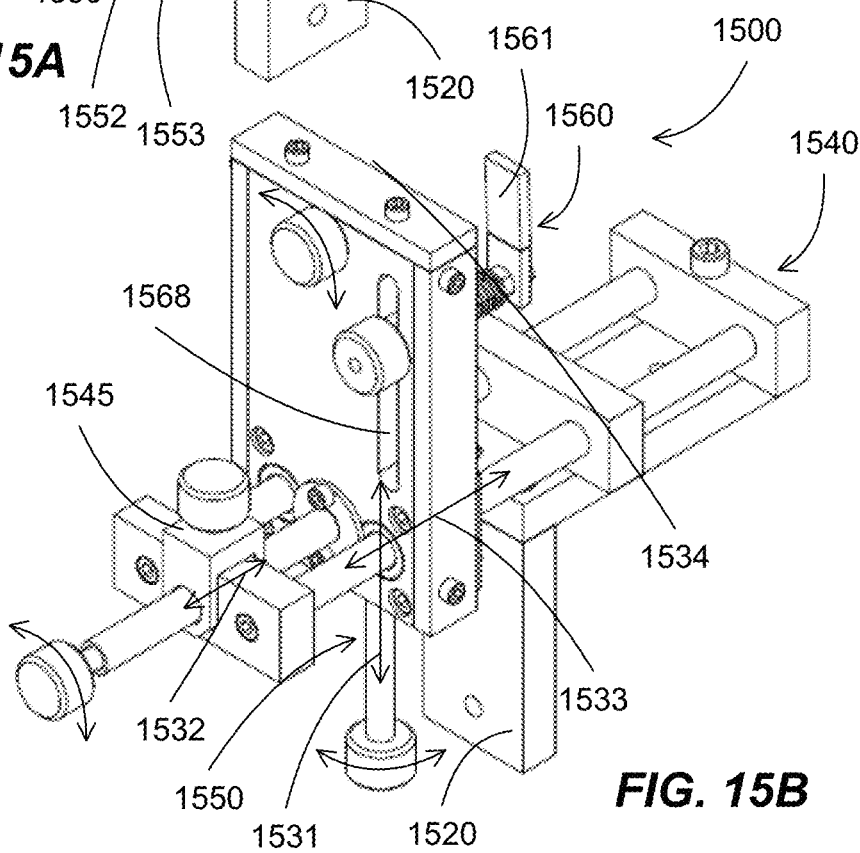

FIGS. 15A-15B illustrate a clamping device according to some embodiments.

Figure 16:
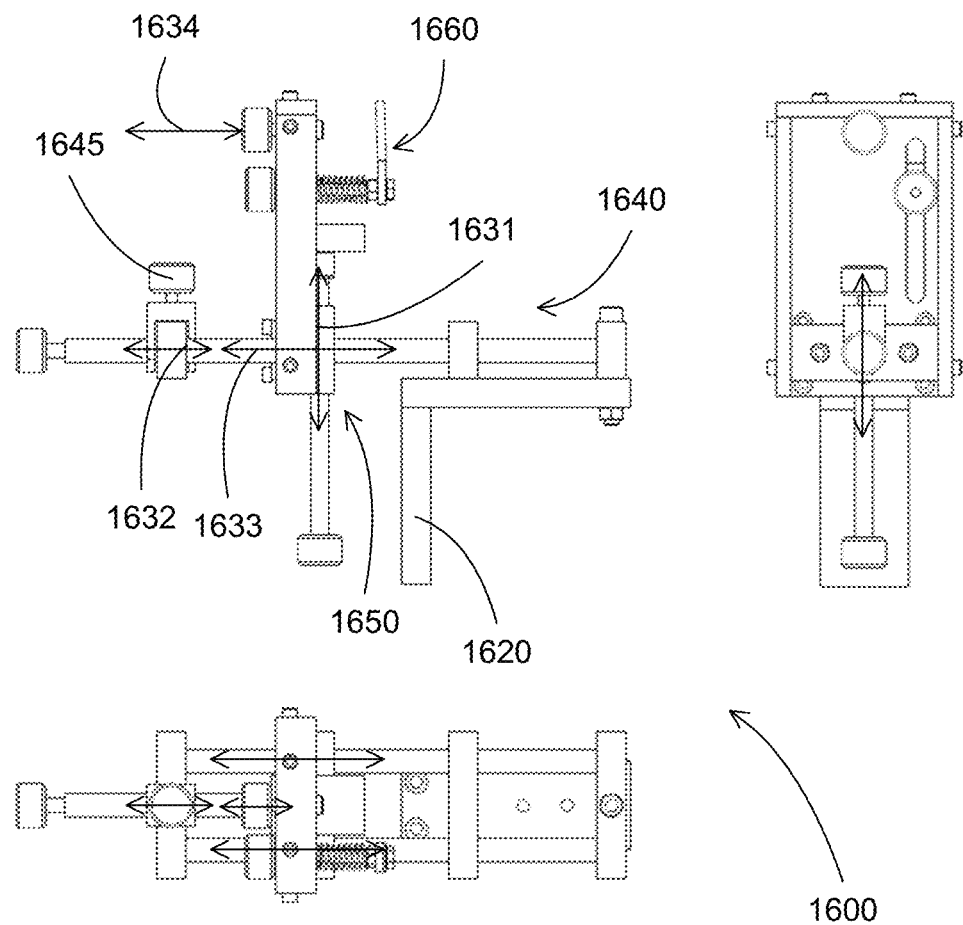
FIG. 16 illustrates different views of the clamping device according to some embodiments.

FIG. 16 illustrates different views of the clamping device according to some embodiments.

A clamping device 1600 can include a coupling 1620 for coupling the clamping device with a support for the top panel. Since the clamping device provides the support for the side panel, moving the mechanisms in the clamping device can move the side panel relative to the top panel.

The clamping device can include a vertical moving mechanism 1650 to move the side panel in a vertical direction 1631, or a direction having a vertical component. In some embodiments, the vertical direction can be the direction perpendicular to the direction along the beveled edge and also perpendicular to the top panel.

The vertical moving mechanism can include a support 1651 for supporting the side panel. The vertical moving mechanism can include a knob 1653 for rotating a screw 1652, such as a lead screw or a ball screw. The rotation of the screw can move the support 1651 up and down, e.g., in a vertical direction 1631.

The clamping device can include a horizontal moving mechanism 1640 to move the side panel in a horizontal direction, or a direction having a horizontal component. In some embodiments, the horizontal direction can be the direction perpendicular to the direction along the beveled edge and also perpendicular to the side panel.

The horizontal moving mechanism can include a linear mechanism 1640A for coarse movements 1633 and a rotating-to-linear mechanism 1640B for fine movements 1632. A lock 1645 can be used to switch between the coarse movements and the fine movements.

The clamping device can include a support for the side panel, including a clamp 1661 for clamping the side panel. The clamp can move up and down in a slot 1668, thus can accommodate side panels having different widths. The clamp can form a fixed point at the clamping point.

The clamping device can include a rotating mechanism 1660 to rotate the side panel around an axis of rotation perpendicular to the vertical and horizontal directions. In some embodiments, the axis of rotation can be the direction along the beveled edge.

The rotating mechanism can include a linear mechanism pushing or pulling 1634 on the side panel to rotate the panel around the fixed point formed by the clamp 1661.

Figures 17A, 17B:
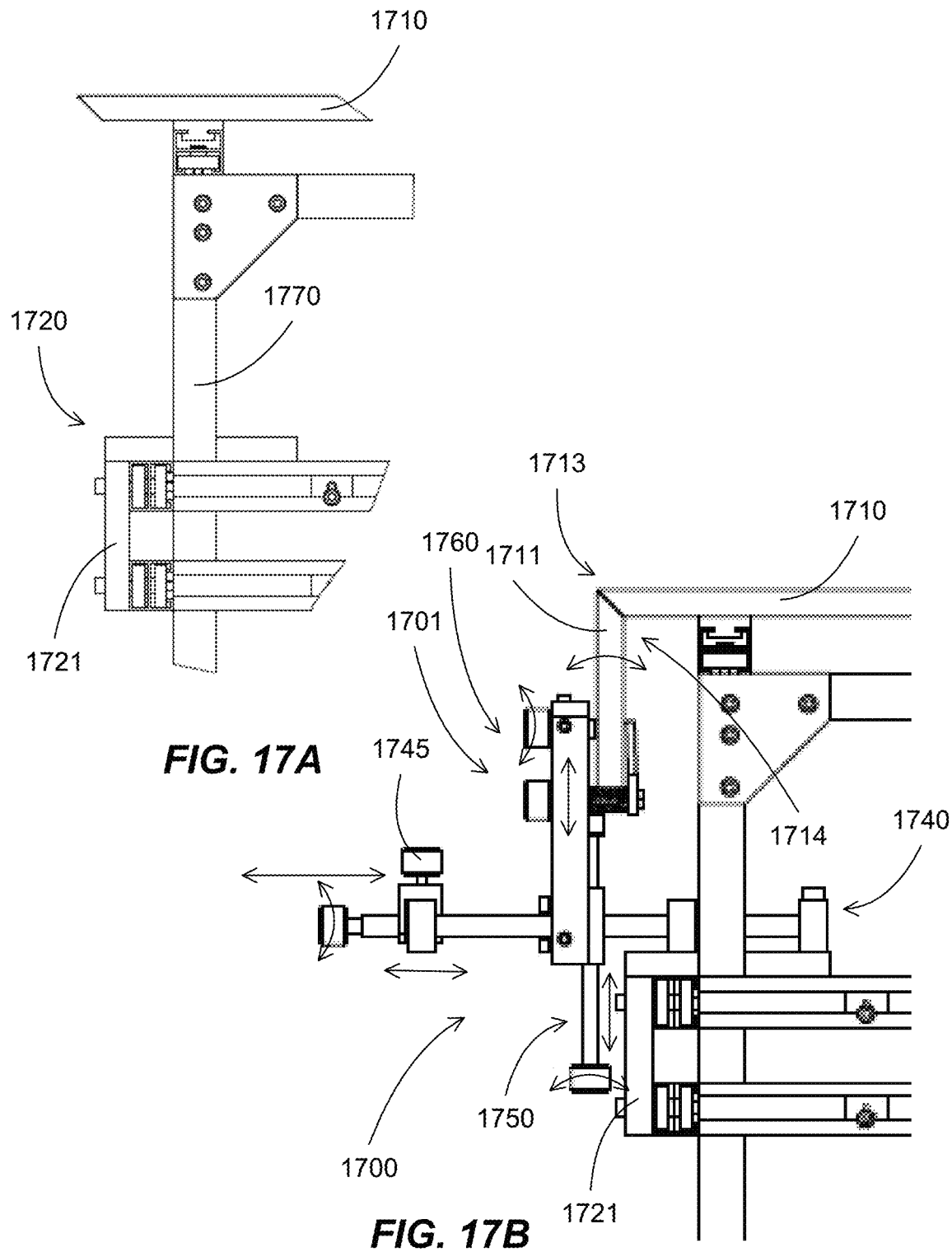
FIGS. 17A-17B illustrate a configuration for the clamping device according to some embodiments.

FIGS. 17A-17B illustrate a configuration for the clamping device according to some embodiments. A clamping device 1700 can include a coupling 1720 for coupling with a support 1770. The support 1770, which can be configured as a table, can be configured to support a top panel 1710. The coupling 1720 can include bracket 1721, which can be secured to the support 1770.

The clamping device 1700 can include a clamp 2101, which can be coupled to the coupling 1720. The clamp 1701 can be used to support a side panel 1711. For example, the side panel can rest on a vertical movement support of a vertical moving mechanism 1750. The side panel can be clamped to a body of the clamp by a clamp element of a rotating mechanism 1760. The clamp element can also function to form a fixed point for the rotating mechanism 1760. Thus a linear movement of the rotating mechanism can rotate the side panel. The clamp 1701 can include a horizontal moving mechanism 1740, which can include a coarse movement mechanism and a fine movement mechanism.

By operating the vertical moving mechanism, the horizontal moving mechanism, and the rotating mechanism, the side panel 1711 can be moved and rotated relative to the top panel 1710, as to achieve a smooth interface 1713 at an outer joined corner, and an angular gap at an inner joined corner to accommodate an adhesive coating.

Figure 18A:
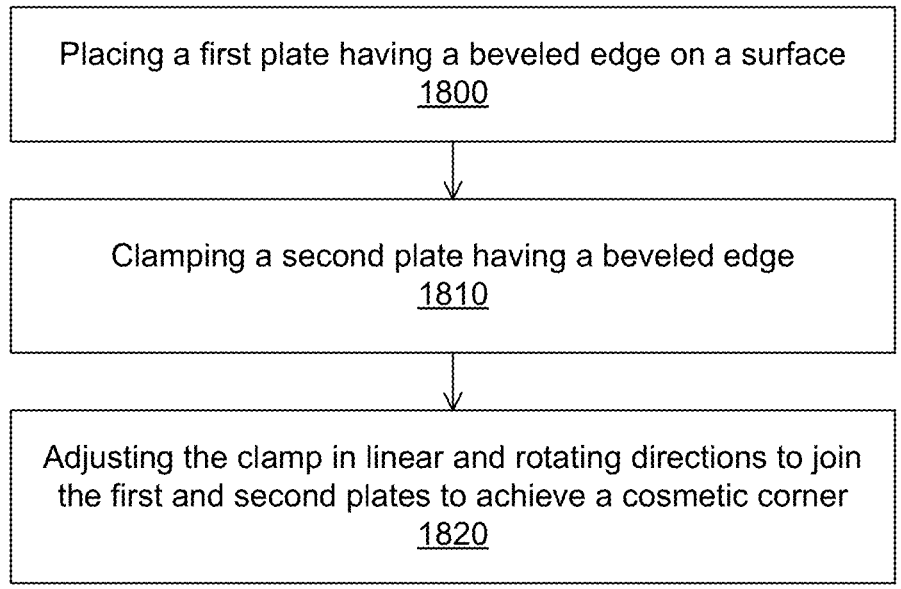
FIGS. 18A-18B illustrate flow charts for operating the clamp according to some embodiments.
Figure 18B:
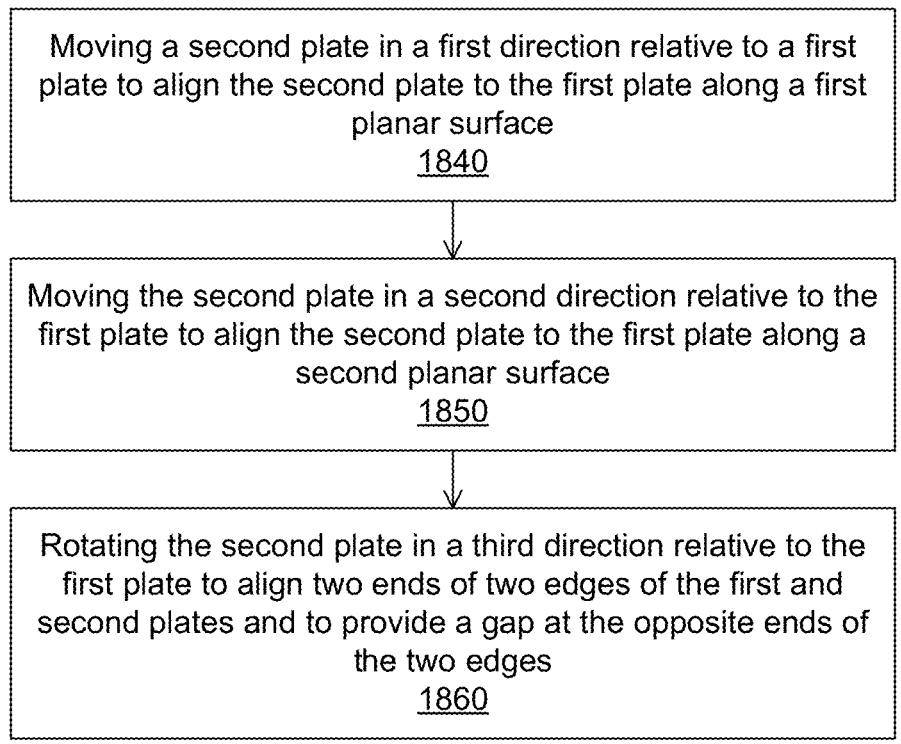

FIGS. 18A-18B illustrate flow charts for operating the clamp according to some embodiments. In FIG. 18A, operation 1800 places a first plate having a beveled edge on a surface. Operation 1810 clamps a second plate having a beveled edge. Operation 1820 adjusts the clamp in linear and rotating directions to join the first and second plates to achieve a cosmetic corner.

In FIG. 18B, operation 1840 moves a second plate in a first direction relative to a first plate to align the second plate to the first plate along a first planar surface. Operation 1810 moves the second plate in a second direction relative to the first plate to align the second plate to the first plate along a second planar surface. Operation 1810 rotates the second plate in a third direction relative to the first plate to align two ends of two edges of the first and second plates and to provide a gap at the opposite ends of the two edges FIGS. 19A-19B illustrate flow charts for operating the clamp according to some embodiments. In FIG. 19A, operation 1900 forms a clamp for securing a second plate against a first plate along beveled edges, wherein the clamp comprises a first movable mechanism for moving the second plate along a first direction, wherein the clamp comprises a second movable mechanism for moving the second plate along a second direction, wherein the second movable mechanism comprises a coarse movement and a fine movement, wherein the clamp comprises a third movable mechanism for rotating the second plate around an element of the clamp that is configured for securing the second plate.

In FIG. 19B, operation 1920 forms a clamp assembly for securing a second plate against a first plate along beveled edges, wherein the clamp assembly comprises a support for supporting the first plate, wherein the clamp assembly comprises at least a clamp for supporting the second plate, wherein the clamp comprises a coupling mechanism for securing the clamp to the support, wherein the clamp comprises a first movable mechanism for moving the second plate along a first direction, wherein the clamp comprises a second movable mechanism for moving the second plate along a second direction, wherein the second movable mechanism comprises a coarse movement and a fine movement, wherein the clamp comprises a third movable mechanism for rotating the second plate around an element of the clamp that is configured for securing the second plate.

In some embodiments, the present invention discloses a clamping device, and methods to operate the clamping device, for joining panels to form a work surface equipment. The clamping device can include a support for a top panel, such as a table on which the top panel can be placed with the work surface facing up. The clamping device can include multiple clamps for supporting a side panel. The clamp can be configured to move the side panel relative to the top panel, to form a seamless interface.

Figure 20A:
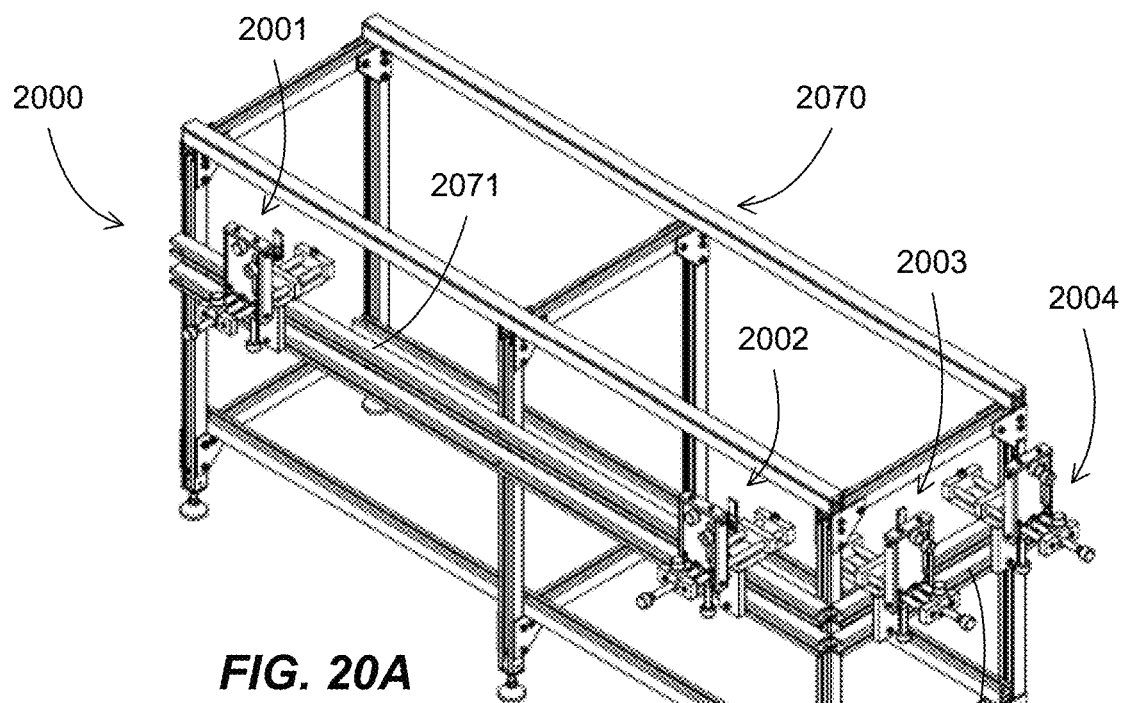
FIGS. 20A-20B illustrate a clamping device according to some embodiments.
Figure 20B:
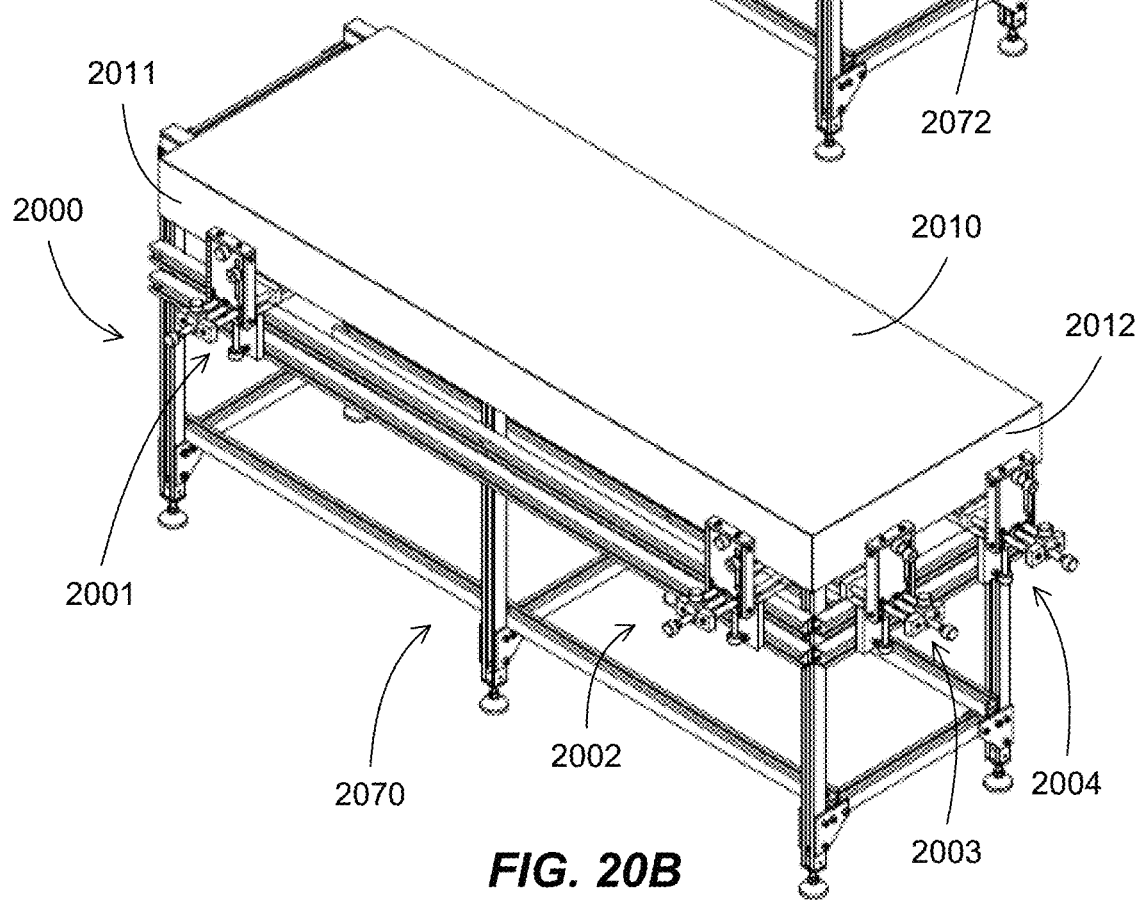

FIGS. 20A-20B illustrate a clamping device according to some embodiments. In FIG. 20A, a clamping device 2000 can include a support 2070 for supporting a top panel. The dimension of the support 2070 can be large enough to accommodate the top panel. For light panels, a secure mechanism can be added to secure the top panel to the support. For heavy panels, the weight of the panels can function as the secure mechanism.

The clamping device 2000 can also include multiple clamps 2001, 2002, 2003, and 2004. The clamps can be distributed in two sides of the support 2070, for forming side panels at two sides of the top panel. Two clamps can be used in each side, such as clamps 2001 and 2002 used in a long side of the top panel, and clamps 2003 and 2004 used in a short side of the top panel.

The clamps can be mounted on rails to allow the clamps to move as a whole. As an example, clamps 2001 and 2002 can be mounted on rail 2071, and clamps 2003 and 2004 can be mounted on rail 2072. The rails 2071 and 2072 can be configured for individual clamps, e.g., a clamp can move along the rail independent of other rails. The rails 2071 and 2072 can allow a worker to adjust the spacing between the clamps. For example, for short top panels, the clamps 2001 and 2002 can be moved to be closer to each other, so that the side panel can be mounted on the clamps.

The support 2070 can also include different moving mechanism for moving the clamps, including moving individual clamps for adjusting positions between the clamps, or moving multiple clamps that are used to support a side panel for adjusting positions of the side panel. For example, the movements of multiple clamps can allow movements of the side panel without changing the orientation of the side panel, such as a linear movement that does not rotate or twist the side panel, or a rotating movement that keeps the side panel current orientation.

FIG. 20B shows a clamping device 2000 working to join side panels 2011 and 2002 onto a top panel 2010. Each side panel can be clamped by two clamps, separating a distance to allow proper support of the side panel. As shown, two clamps are used for a side panel, but other numbers of clamps for a side panel can be used.

FIGS. 21A-21C illustrate a clamping device according to some embodiments. In FIG. 21A, a portion of a clamping device 2100 is shown with a short side of a top panel 2110, with a side panel 2111 interfacing the top panel 2110. The top panel can be supported by a support 2170. A clamping 2102 is shown, which is mounted on rail 2171 on the support 2170, and which supports the side panel. The clamp 2102 can moved along the rail 2171, in a direction in and out of the figure as shown. There can be at least another clamp mounted on the rail and supporting the side panel. Also shown is rail 2202 on the support 2170 along the short side of the support. Other clamps can be mounted on the rail 2172 for supporting another side panel for bonding with the short side of the top panel.

FIG. 21B shows a clamping device with clamps 2103 and 2104 mounted on rail 2172 for supporting a side panel 2112. The clamps 2103 and 2104 can move along the rail 2172 for properly clamping locations on the side panel 2112.

FIG. 21C shows a clamping device with clamps 2101 and 2102 mounted on rail 2171 for supporting a side panel 2111. The clamps 2101 and 2102 can move along the rail 2171 for properly clamping locations on the side panel 2111.

In some embodiments, the clamping device can provide movements of individual clamps and multiple clamps together. For example, the clamps can be mounted on rails coupled to a support of the clamping device. The rail can allow the clamps to move individually along the length of the rail, for example, to change the relative position between the clamps.

Multiple clamps can be mounted on a moving mechanism, such as a linear guide for linearly moving together along the linear guide, or a rotating arm for rotating together along an axis of rotation. For example, two clamps can be coupled to a rail that can allow movement of both clamps without changing the relative configuration between the clamps, such as allowing the clamps to move together in vertical and horizontal directions. Thus individual clamps can be set so that the side panel is parallel to the top panel, in a vertical or horizontal direction. Then both clamps can be moved together to separate the side panel from the top panel without changing the orientation of the side panel. This can allow dry run of the panel joining, e.g., individual clamps can be set to form seamless interface between the side and top panels without an adhesive coating. Then the clamps can be moved together, e.g., separating the side panel from the top panel. An adhesive coating can be applied. The clamps are then moved together to form the join between the panel.

Further, the rails can be used for repeating work, e.g., joining work surface equipments having a same size of side and top panels. After individual clamps are set for a first work surface equipment, later movements can be performed on both clamps for a faster work throughput.

Figure 22A:
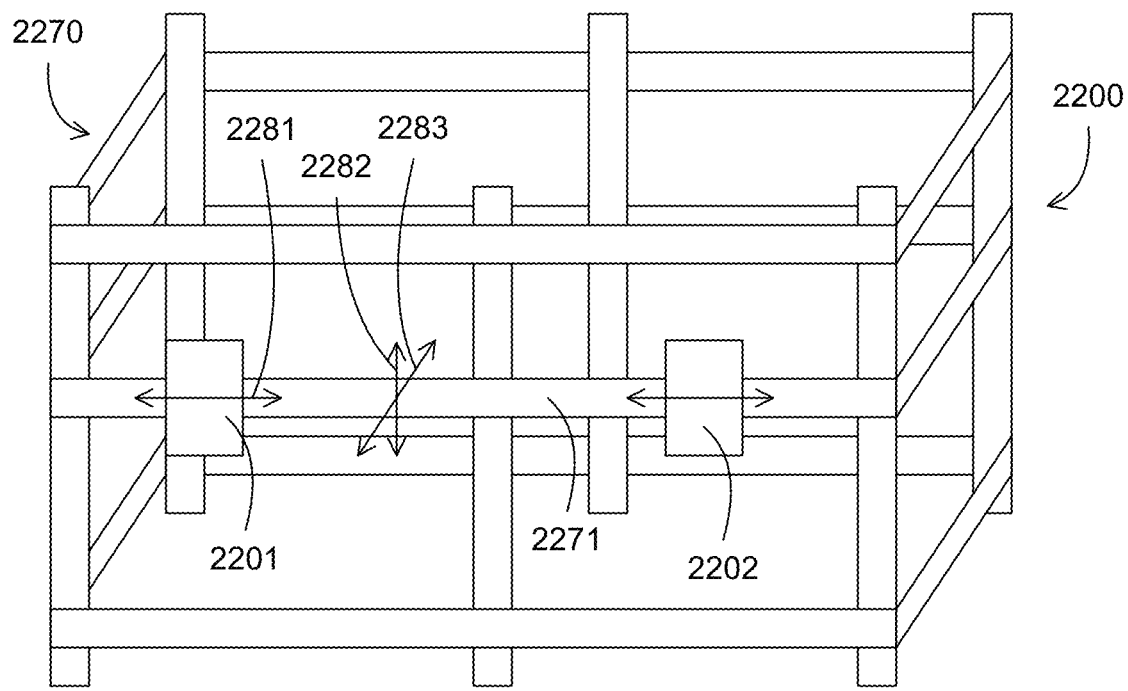
FIGS. 22A-22C illustrate a configuration for moving mechanisms for multiple clamps according to some embodiments.
Figure 22B:
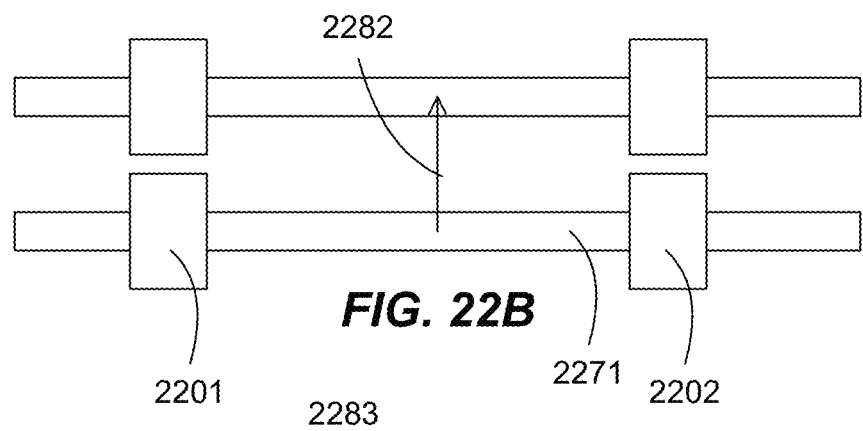
Figure 22C:
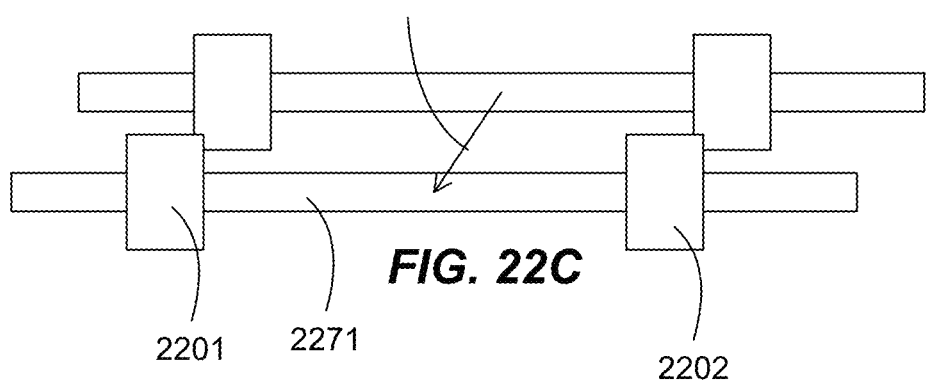

FIGS. 22A-22C illustrate a configuration for moving mechanisms for multiple clamps according to some embodiments. A clamping device 2200 can include a support 2270, together with one or more clamps 2201 and 2202. Two clamps are shown, but there can be other clamps mounting on the support 2270.

A rail 2271 can be coupled to the support 2270, for example, in a horizontal direction. The clamps 2201 and 2202 can be individually mounted on the rail 2271. Thus the clamps 2201 and 2202 can move 2281 independently along the rail, e.g., in a horizontal direction. The horizontal movements can change a distance between the clamps, which can allow the clamps to support different sizes of side panels. For example, the clamps can move to be close to each other to support a short side panel, and can move further apart to support a longer side panel.

Other moving mechanisms can be coupled to the rail 2271, for example, to move the rail, and the clamps mounted on the rail, in other directions, such as in perpendicular directions of vertical direction 2282 and another horizontal direction 2283.

The vertical movement 2282 can move the rail 2271, thus can move the clamps 2201 and 2202 as a unit along the vertical direction. Thus the vertical movement can move a side panel supported by the clamps 2201 and 2202 up and down in a same vertical plane while maintaining a same orientation without twisting or rotating. For example, after the side panel is adjusted to be seamlessly interfaced with a top panel, the side panel can move down, without any effect on the alignment with the top panel, by moving the two clamps together through the vertical movement of the rail 2271.

The vertical movement 2283 can also move the rail 2271, thus can move the clamps 2201 and 2202 as a unit along a horizontal direction, such as a horizontal direction in and out of the figure as shown. Thus the horizontal movement can move a side panel supported by the clamps 2201 and 2202 in a same horizontal plane while maintaining a same orientation without twisting or rotating. For example, after the side panel is adjusted to be seamlessly interfaced with a top panel, the side panel can move away from the top panel, without any effect on the alignment with the top panel, by moving the two clamps together through the horizontal movement of the rail 2271.

In some embodiments, alignment mechanisms can be provided to assist in the alignment of the side panel with the top panel to allow a pleasing appearance of the interface for the bonding of the side panel with the top panel. For example, individual clamps can be adjusted so that the side panel can be parallel with the top panel.

In some embodiments, the alignment mechanisms can include an emitter, such as a laser, that can generate a straight line. The straight line can be intercepted by the panel, and the position of the panel can be adjusted, through the adjustment of the clamps, so that the panel can be parallel to the straight line.

FIGS. 23A-23C illustrate an alignment mechanism and process for aligning a side panel according to some embodiments. A laser 2381 can be mounted on a top panel 2310. The laser can emit a straight line 2383. The straight line can be seen on the side panel 2311, or on an extension 2382 that is coupled to the side panel (or to the rail or the clamps). The side panel or the extension can have another straight line 2384, which is parallel to the edge of the side panel.

Thus, the clamps can be adjusted, so that the laser line 2383 can coincide or be parallel with the line representing the edge of the side panel. For example, in general, the line emitted from the laser can be horizontal, since the top panel can be placed horizontally on the support. Thus the laser can provide a horizontal line on the side panel or on the extension. One or both of the clamps supporting the side panel can be adjusted, e.g., moving a moving mechanism of the clamps, so that edge line, e.g., line 2384, can be parallel or coincide with the laser line. Afterward, the clamps can be moved together. This can provide that the side panel is parallel to the top panel.

FIGS. 24A-24C illustrate an alignment mechanism and process for aligning a side panel according to some embodiments. A laser 2481 can be mounted on a side panel 2411. The laser can emit a straight line 2483. The straight line can be seen on the top panel 2410, or on an extension 2482 that is coupled to the top panel (or to any component coupled to the top panel). The top panel or the extension can have another straight line 2484, which is parallel to the edge of the top panel.

Thus, the clamps can be adjusted, so that the laser line 2483 can coincide or be parallel with the line representing the edge of the top panel. For example, in general, the edge line 1884, e.g., the line representing the edge of the top panel, can be horizontally parallel to the edge of the top panel. The line emitted from the laser can be parallel to the edge of the side panel. One or both of the clamps supporting the side panel can be adjusted, e.g., moving a moving mechanism of the clamps, so that laser line, e.g., line 2483, can be parallel or coincide with the edge line 2483. Afterward, the clamps can be moved together. This can provide that the side panel is parallel to the top panel.

In some embodiments, the present invention discloses a clamping system for joining beveled edge panels using an adhesive material. The clamping system can include a panel support, together with one or more clamping devices mounted on rails of the panel support.

A laser assembly can be coupled to the clamping device or to the panel support. The laser assembly can be configured to provide a laser line parallel to the beveled edge, and can be configured to align the beveled edges.

In some embodiments, more than one clamping devices coupled to a same rail can move together as a unit, using a moving mechanism.

FIGS. 25A-25C illustrate flow charts for operating the clamp according to some embodiments. In FIG. 25A, operation 2500 forms a clamp assembly for securing a second plate against a first plate along beveled edges, wherein the clamp assembly comprises a support for supporting the first plate, wherein the clamp assembly comprises multiple clamps for supporting the second plate, wherein the multiple clamps are movably coupled to the support to adjust a distance between the multiple clamps.

In FIG. 25B, operation 2520 forms a clamp assembly for securing a second plate against a first plate along beveled edges, wherein the clamp assembly comprises a support for supporting the first plate, wherein the clamp assembly comprises multiple clamps for supporting the second plate, wherein the multiple clamps are movably coupled to the support to move the multiple clamps as a unit along a direction of alignment the second plate to the first plate In FIG. 25C, operation 2540 forms a clamp assembly for securing multiple plates against a first plate along beveled edges, wherein the clamp assembly comprises a support for supporting the first plate, wherein the clamp assembly comprises multiple first clamps for supporting a second plate of the multiple plates to be secured to the first plate in a first direction, wherein the multiple first clamps are movably coupled to the support to adjust a distance between the multiple first clamps, wherein the clamp assembly comprises multiple second clamps for supporting a third plate of the multiple plates to be secured to the first plate in a second direction, wherein the multiple second clamps are movably coupled to the support to adjust a distance between the multiple second clamps.

In some embodiments, the present invention discloses a method for joining panels along the beveled edges. The method can include positioning the first panel on a panel support. The method can include clamping the second panel on a clamping device. The first and second panels can be positioned so that the first beveled edge faces the second beveled edge. The method can include adjusting the clamping device, using a combination of first coarse movements and first fine movements, to align the first beveled edge to the second beveled edge. The alignment can include a seamless appearance at a first surface of the beveled edges. The alignment can include an angled gap at a second surface of the beveled edges. The second surface can be opposite the first surface. The method can include adjusting the clamping device, using second coarse movements, to separate the first beveled edge from the second beveled edge. The method can include applying an adhesive material to the first and second beveled edges. The method can include adjusting the clamping device, using third coarse movements, to re-align the first and the second beveled edges. The third coarse movements can be the reverse of the second coarse movements.

What is claimed is:

1. A clamping device for joining, using an adhesive material, a first panel comprising a first beveled edge with a second panel comprising a second beveled edge along the first and second beveled edges,
    wherein the first panel comprises a first surface and a second surface opposite the first surface,
    wherein the first panel comprises a first side comprising the first beveled edge,
    wherein the first panel comprises a second side opposite the first side,
the clamping device comprising
    a first assembly configured to support a first panel,
        wherein the first assembly comprises a first support configured to support the second side,
        wherein the first assembly comprises a second support configured to support a first area on the second surface,
        wherein the second support is configured to contact the first panel at a location in a vicinity of the second side away from the first side to expose the first beveled edge,
        wherein the first assembly comprises a first mechanism,
        wherein the first mechanism comprises a first motion converter configured to convert a first rotational movement to a first linear movement to linearly move the first support in a first direction comprising a vertical component,
        wherein the first assembly comprises a second mechanism,
        wherein the second mechanism comprises a second motion converter configured to convert a second rotational movement to a second linear movement,
        wherein the second linear movement is configured to linearly move a second area on the first surface in a second direction comprising a horizontal component,
        wherein the first and second area are not in a same plane parallel to the first side to enable the second mechanism to rotate the first panel around a third direction parallel to the first side;
    a second assembly configured to support and move the first assembly,
        wherein the second assembly comprises a linear guide configured to support and guide the first assembly in a fourth direction comprising a horizontal component,
        wherein the second assembly comprises a third mechanism to move the first assembly,
        wherein the third mechanism is configured to move the first assembly in a fine step configuration and a coarse step configuration,
        wherein, in the fine step configuration, the third mechanism comprises a third motion converter configured to convert a third rotational movement to a third linear movement configured to linearly move the first assembly,
        wherein, in the coarse step configuration, the third mechanism comprises a fourth linear movement configured to linearly move the first assembly.

2. A clamping device as in claim 1
    wherein the first assembly comprises a linear guide configured to guide the first support in the first direction.

3. A clamping device as in claim 1
    wherein the second support comprises a plate configured to press on the first area.

4. A clamping device as in claim 1
    wherein the second support comprises a bending plate configured to press on the first area as a line parallel to the third direction.

5. A clamping device as in claim 1
    wherein the second mechanism is configured to rotate the first panel to a maximum angle of 5 degrees.

6. A clamping device as in claim 1
    wherein the third mechanism comprises a first portion configured to move the first assembly in the coarse step configuration,
    wherein the third mechanism comprises a locking element,
    wherein the locking element is configured to lock the first portion to enable the operation of the fine step configuration.

7. A clamping device as in claim 1
    wherein the third mechanism comprises two concentric elements coupled to the first assembly,
    wherein the outer concentric element is configured to move the second assembly in the coarse step configuration,
    wherein the inner concentric element is configured to move the second assembly in the fine step configuration.

8. A clamping device as in claim 1
    wherein the third mechanism comprises an outer tube coupled to the first assembly,
    wherein the outer tube is configured to move the second assembly in the coarse step configuration,
    wherein the third mechanism comprises an inner rod threaded inside the outer tube,
    wherein the inner rod is coupled to the first assembly,
    wherein the inner rod is configured to move the second assembly in the fine step configuration when rotating against the outer tube with the outer tube fixedly coupled to the first assembly.

9. A clamping device as in claim 1
    wherein the second support is coupled to a spring,
    wherein the spring is configured to accommodate different thicknesses of the first panel.

10. A clamping device as in claim 1
    wherein the second support is coupled to the first support.

11. A clamping device as in claim 1
    wherein the first support is coupled to a linear guide coupled to a body of the first assembly,
    wherein the second support is coupled to the body,
    wherein the second support is configured to be independently operated from the first support.

12. A clamping device as in claim 1
    wherein the first mechanism is configured to move the first support in a fine step configuration and a coarse step configuration,
    wherein, in the fine step configuration, the first mechanism comprises the second motion converter,
    wherein, in the coarse step configuration, the first mechanism comprises a fifth linear movement configured to linearly move the first support.

13. A clamping device as in claim 1
    wherein the first mechanism is configured to move the first support in a fine step configuration and a coarse step configuration,
    wherein, in the fine step configuration, the first mechanism comprises the second motion converter, wherein, in the coarse step configuration, the first mechanism comprises a fifth linear movement configured to linearly move the first support, wherein, in the coarse step configuration, the first mechanism is configured to move the first support to separate the first panel from the second panel a distance sufficient to allow an application of the adhesive material to the beveled edges.

14. A clamping device as in claim 1 wherein, in the coarse step configuration, the third mechanism is configured to move the first assembly to separate the first panel from the second panel a distance sufficient to allow an application of the adhesive material to the beveled edges.

15. A clamping device as in claim 1 further comprising a laser assembly coupled to the first assembly, wherein the laser assembly is configured to provide a laser line parallel to the first surface, wherein the laser line is configured to align the two beveled edges.

16. A clamping system for joining, using an adhesive material, a first panel comprising a first beveled edge with a second panel comprising a second beveled edge along the first and second beveled edges, wherein the first panel comprises a first surface and a second surface opposite the first surface, wherein the first panel comprises a first side comprising the first beveled edge, wherein the first panel comprises a second side opposite the first side, wherein the second panel comprises a third surface and a fourth surface opposite the third surface, wherein the second panel comprises a third side comprising the second beveled edge, the clamping system comprising a panel support, wherein the panel support is configured to support the second panel, wherein the third surface of the second panel is placed on the panel support, wherein the panel support comprises a rail at a side of the panel support;

one or more clamping devices, wherein the one or more clamping devices are mounted on the rail, wherein the one or more clamping devices are movably and fixedly coupled to the rail, wherein each clamping device comprises a first assembly configured to support the first panel, wherein the first assembly comprises a first support configured to support the second side, wherein the first assembly comprises a second support configured to support a first area on the second surface, wherein the second support is configured to contact the first panel at a location in a vicinity of the second side away from the first side to expose the first beveled edge, wherein the first assembly comprises a first mechanism, wherein the first mechanism comprises a first motion converter configured to convert a first rotational movement to a first linear movement to linearly move the first support in a first direction comprising a vertical component, wherein the first assembly comprises a second mechanism, wherein the second mechanism comprises a second motion converter configured to convert a second rotational movement to a second linear movement, wherein the second linear movement is configured to linearly move a second area on the first surface in a second direction comprising a horizontal component, wherein the first and second area are not in a same plane parallel to the first side to enable the second mechanism to rotate the first panel around a third direction parallel to the first side;

a second assembly configured to support and move the first assembly, wherein the second assembly comprises a linear guide configured to support and guide the first assembly in a fourth direction comprising a horizontal component, wherein the second assembly comprises a third mechanism to move the first assembly, wherein the third mechanism is configured to move the first assembly in a fine step configuration and a coarse step configuration, wherein, in the fine step configuration, the third mechanism comprises a third motion converter configured to convert a third rotational movement to a third linear movement configured to linearly move the first assembly, wherein, in the coarse step configuration, the third mechanism comprises a fourth linear movement configured to linearly move the first assembly.

17. A clamping device as in claim 16 further comprising one or more a clamps configured to secure the second panel to the panel support.

18. A clamping device as in claim 16 further comprising one or more clamping devices coupled to another rail at another side of the panel support.

19. A clamping device as in claim 16 further comprising a fourth mechanism coupled to the one or more clamping devices to move the one or more clamping devices as a unit.

* * * * *